US010873506B2

(12) United States Patent
Pani et al.

(10) Patent No.: US 10,873,506 B2
(45) Date of Patent: Dec. 22, 2020

(54) VALIDATION OF A VIRTUAL PORT CHANNEL (VPC) ENDPOINT IN THE NETWORK FABRIC

(71) Applicant: Cisco Technology, Inc., San Jose, CA (US)

(72) Inventors: Ayas Pani, Fremont, CA (US); Sanchay Harneja, Belmont, CA (US); Manali Holankar, San Diego, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/712,113

(22) Filed: Dec. 12, 2019

(65) Prior Publication Data

US 2020/0119989 A1 Apr. 16, 2020

Related U.S. Application Data

(63) Continuation of application No. 15/662,496, filed on Jul. 28, 2017, now Pat. No. 10,547,509.

(Continued)

(51) Int. Cl.
*G06F 15/16* (2006.01)
*H04L 12/24* (2006.01)
*H04L 12/26* (2006.01)

(52) U.S. Cl.
CPC ...... *H04L 41/0873* (2013.01); *H04L 41/0686* (2013.01); *H04L 43/065* (2013.01); *H04L 41/22* (2013.01)

(58) Field of Classification Search
CPC .................................................. H04L 41/0873

(Continued)

(56) References Cited

U.S. PATENT DOCUMENTS 4,298,770 A 11/1981 Nishihara et al.
4,636,919 A 1/1987 Itakura et al.
(Continued)

FOREIGN PATENT DOCUMENTS

CN 103297552 9/2013
CN 104639464 5/2015
(Continued)

OTHER PUBLICATIONS

Abdo, E., "HOST_ID TCP Options: Implementation &Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.
(Continued)

*Primary Examiner* — Hamza N Algibhah
(74) *Attorney, Agent, or Firm* — Polsinelli PC

(57) ABSTRACT

Systems, methods, and computer-readable media are disclosed for validating endpoint information for nodes in a network. A network assurance appliance is configured to retrieve, from a first leaf node in a network, first endpoint information for a first set of endpoints connected to the first leaf node, wherein the first set of endpoints includes a virtual port channel (VPC) endpoint. The network assurance appliance retrieves second endpoint information from a second node in the network, compares the first endpoint information with the second endpoint information, and identifies an inconsistency when the first endpoint information and the second endpoint information do not match.

20 Claims, 25 Drawing Sheets

Related U.S. Application Data

(60) Provisional application No. 62/521,661, filed on Jun. 19, 2017.

(58) Field of Classification Search
USPC .................................................. 709/224
See application file for complete search history.

(56) References Cited

U.S. PATENT DOCUMENTS

| | | |
|---|---|---|
| 4,700,016 A | 10/1987 | Hitchcock et al. |
| 5,859,835 A | 1/1999 | Varma et al. |
| 5,926,458 A | 7/1999 | Yin |
| 5,983,278 A | 11/1999 | Chong et al. |
| 6,230,231 B1 | 5/2001 | Delong et al. |
| 6,330,614 B1 | 12/2001 | Aggarwal et al. |
| 6,389,031 B1 | 5/2002 | Chao et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,769,033 B1 | 7/2004 | Bass et al. |
| 6,834,139 B1 | 12/2004 | Prairie et al. |
| 6,876,952 B1 | 4/2005 | Kappler et al. |
| 6,907,039 B2 | 6/2005 | Shen |
| 6,941,649 B2 | 9/2005 | Goergen et al. |
| 6,952,421 B1 | 10/2005 | Slater |
| 6,954,463 B1 | 10/2005 | Ma et al. |
| 6,996,099 B1 | 2/2006 | Kadambi et al. |
| 7,003,562 B2 | 2/2006 | Mayer |
| 7,068,667 B2 | 6/2006 | Foster et al. |
| 7,127,686 B2 | 10/2006 | Dreschler et al. |
| 7,152,117 B1 | 12/2006 | Stapp et al. |
| 7,177,946 B1 | 2/2007 | Kaluve et al. |
| 7,181,530 B1 | 2/2007 | Halasz et al. |
| 7,216,161 B1 | 5/2007 | Peckham et al. |
| 7,336,670 B1 | 2/2008 | Calhoun et al. |
| 7,372,857 B1 | 5/2008 | Kappler et al. |
| 7,379,459 B2 | 5/2008 | Ohnishi |
| 7,411,915 B1 | 8/2008 | Spain et al. |
| 7,426,604 B1 | 9/2008 | Rygh et al. |
| 7,453,886 B1 | 11/2008 | Allan |
| 7,463,590 B2 | 12/2008 | Mualem et al. |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,630,368 B2 | 12/2009 | Tripathi et al. |
| 7,698,561 B2 | 4/2010 | Nagendra et al. |
| 7,729,296 B1 | 6/2010 | Choudhary et al. |
| 7,735,114 B2 | 6/2010 | Kwan et al. |
| 7,738,377 B1 | 6/2010 | Agostino et al. |
| 7,742,406 B1 | 6/2010 | Muppala |
| 7,765,093 B2 | 7/2010 | Li et al. |
| 7,826,469 B1 | 11/2010 | Li et al. |
| 7,852,748 B2 | 12/2010 | Le Faucheur et al. |
| 7,940,763 B1 | 5/2011 | Kastenholz |
| 8,010,952 B2 | 8/2011 | Datla et al. |
| 8,028,160 B1 | 9/2011 | Orr |
| 8,073,935 B2 | 12/2011 | Viswanath |
| 8,103,480 B2 | 1/2012 | Korn et al. |
| 8,170,025 B2 | 5/2012 | Kloth et al. |
| 8,190,719 B2 | 5/2012 | Furukawa |
| 8,190,843 B1 | 5/2012 | De Forest et al. |
| 8,195,736 B2 | 6/2012 | Malloy et al. |
| 8,209,738 B2 | 6/2012 | Nicol et al. |
| 8,261,339 B2 | 9/2012 | Aldridge et al. |
| 8,302,301 B2 | 11/2012 | Lau |
| 8,312,261 B2 | 11/2012 | Rao et al. |
| 8,325,459 B2 | 12/2012 | Mutnury et al. |
| 8,339,973 B1 | 12/2012 | Pichumani et al. |
| 8,369,335 B2 | 2/2013 | Jha et al. |
| 8,375,117 B2 | 2/2013 | Venable, Sr. |
| 8,411,688 B2 | 4/2013 | Farkas et al. |
| 8,423,632 B2 | 4/2013 | Yin et al. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,509,087 B2 | 8/2013 | Rajagopalan et al. |
| 8,515,682 B2 | 8/2013 | Buhler et al. |
| 8,554,883 B2 | 10/2013 | Sankaran |
| 8,605,575 B2 | 12/2013 | Gunukula et al. |
| 8,627,328 B2 | 1/2014 | Mousseau et al. |
| 8,645,984 B1 | 2/2014 | Beskrovny et al. |
| 8,687,629 B1 | 4/2014 | Kompella et al. |
| 8,693,344 B1 | 4/2014 | Adams et al. |
| 8,752,175 B2 | 6/2014 | Porter |
| 8,761,036 B2 | 6/2014 | Fulton et al. |
| 8,824,482 B2 | 9/2014 | Kajekar et al. |
| 8,868,766 B1 | 10/2014 | Theimer et al. |
| 8,874,876 B2 | 10/2014 | Bhadra et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 8,934,340 B1 | 1/2015 | Mater et al. |
| 8,995,272 B2 | 3/2015 | Agarwal et al. |
| 9,019,840 B2 | 4/2015 | Salam et al. |
| 9,031,959 B2 | 5/2015 | Liu |
| 9,038,151 B1 | 5/2015 | Chua et al. |
| 9,053,070 B1 | 6/2015 | Arguelles |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,197,553 B2 | 11/2015 | Jain et al. |
| 9,203,188 B1 | 12/2015 | Siechen et al. |
| 9,203,753 B2 | 12/2015 | Leung et al. |
| 9,225,601 B2 | 12/2015 | Khurshid et al. |
| 9,241,005 B1 | 1/2016 | Orr |
| 9,246,818 B2 | 1/2016 | Deshpande et al. |
| 9,258,195 B1 | 2/2016 | Pendleton et al. |
| 9,264,922 B2 | 2/2016 | Gillot et al. |
| 9,274,710 B1 | 3/2016 | Oikarinen et al. |
| 9,276,877 B1 | 3/2016 | Chua et al. |
| 9,300,581 B1 | 3/2016 | Hui et al. |
| 9,319,300 B2 | 4/2016 | Huynh Van et al. |
| 9,344,348 B2 | 5/2016 | Ivanov et al. |
| 9,356,942 B1 | 5/2016 | Joffe |
| 9,374,294 B1 | 6/2016 | Pani |
| 9,402,470 B2 | 8/2016 | Shen et al. |
| 9,407,501 B2 | 8/2016 | Yadav et al. |
| 9,414,224 B1 | 8/2016 | Schmidt et al. |
| 9,433,081 B1 | 8/2016 | Xiong et al. |
| 9,444,634 B2 | 9/2016 | Pani et al. |
| 9,444,842 B2 | 9/2016 | Porras et al. |
| 9,497,215 B2 | 11/2016 | Vasseur et al. |
| 9,502,111 B2 | 11/2016 | Dharmapurikar et al. |
| 9,509,092 B2 | 11/2016 | Shen et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,565,202 B1 | 2/2017 | Kindlund et al. |
| 9,571,502 B2 | 2/2017 | Basso et al. |
| 9,571,523 B2 | 2/2017 | Porras et al. |
| 9,590,914 B2 | 3/2017 | Alizadeh Attar et al. |
| 9,594,640 B1 | 3/2017 | Chheda |
| 9,602,424 B1 | 3/2017 | Vincent et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,660,886 B1 | 5/2017 | Ye et al. |
| 9,667,431 B2 | 5/2017 | Pani |
| 9,667,551 B2 | 5/2017 | Edsall et al. |
| 9,667,645 B1 | 5/2017 | Belani et al. |
| 9,669,459 B2 | 6/2017 | Guthrie et al. |
| 9,674,086 B2 | 6/2017 | Ma et al. |
| 9,680,875 B2 | 6/2017 | Knjazihhin et al. |
| 9,686,180 B2 | 6/2017 | Chu et al. |
| 9,698,994 B2 | 7/2017 | Pani |
| 9,710,407 B2 | 7/2017 | Oikarinen et al. |
| 9,716,665 B2 | 7/2017 | Alizadeh Attar et al. |

(56) References Cited

U.S. PATENT DOCUMENTS

| | | |
|---|---|---|
| 9,729,387 B2 | 8/2017 | Agarwal et al. |
| 9,742,673 B2 | 8/2017 | Banerjee et al. |
| 9,755,965 B1 | 9/2017 | Yadav et al. |
| 9,806,995 B2 | 10/2017 | Chu et al. |
| 9,825,857 B2 | 11/2017 | Banerjee et al. |
| 9,832,122 B2 | 11/2017 | Dharmapurikar et al. |
| 9,838,248 B1 | 12/2017 | Grammel et al. |
| 9,876,711 B2 | 1/2018 | Chu et al. |
| 2002/0124107 A1 | 9/2002 | Goodwin |
| 2002/0126671 A1 | 9/2002 | Ellis et al. |
| 2002/0146026 A1 | 10/2002 | Unitt et al. |
| 2003/0035385 A1 | 2/2003 | Walsh et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0123462 A1 | 7/2003 | Kusayanagi |
| 2003/0137940 A1 | 7/2003 | Schwartz et al. |
| 2003/0174650 A1 | 9/2003 | Shankar et al. |
| 2003/0231646 A1 | 12/2003 | Chandra et al. |
| 2004/0062259 A1 | 4/2004 | Jeffries et al. |
| 2004/0073647 A1 | 4/2004 | Gentile et al. |
| 2004/0073715 A1 | 4/2004 | Folkes et al. |
| 2004/0085974 A1 | 5/2004 | Mies et al. |
| 2004/0100901 A1 | 5/2004 | Bellows |
| 2004/0103310 A1 | 5/2004 | Sobel et al. |
| 2004/0160956 A1 | 8/2004 | Hardy et al. |
| 2004/0249960 A1 | 12/2004 | Hardy et al. |
| 2005/0002386 A1 | 1/2005 | Shiragaki |
| 2005/0007961 A1 | 1/2005 | Scott et al. |
| 2005/0013280 A1 | 1/2005 | Buddhikot et al. |
| 2005/0083933 A1 | 4/2005 | Fine et al. |
| 2005/0108389 A1 | 5/2005 | Kempin et al. |
| 2005/0114541 A1 | 5/2005 | Ghetie et al. |
| 2005/0144290 A1 | 6/2005 | Mallal et al. |
| 2005/0175020 A1 | 8/2005 | Park et al. |
| 2005/0207410 A1 | 9/2005 | Adhikari et al. |
| 2005/0281392 A1 | 12/2005 | Weeks et al. |
| 2006/0028285 A1 | 2/2006 | Jang et al. |
| 2006/0031643 A1 | 2/2006 | Figueira |
| 2006/0078120 A1 | 4/2006 | Mahendran et al. |
| 2006/0123481 A1 | 6/2006 | Bhatnagar et al. |
| 2006/0183488 A1 | 8/2006 | Billhartz |
| 2006/0198315 A1 | 9/2006 | Sasagawa et al. |
| 2006/0200862 A1 | 9/2006 | Olson et al. |
| 2006/0209688 A1 | 9/2006 | Tsuge et al. |
| 2006/0221835 A1 | 10/2006 | Sweeney et al. |
| 2006/0250982 A1 | 11/2006 | Yuan et al. |
| 2006/0268742 A1 | 11/2006 | Chu et al. |
| 2006/0280179 A1 | 12/2006 | Meier |
| 2007/0006211 A1 | 1/2007 | Venkiteswaran |
| 2007/0025241 A1 | 2/2007 | Nadeau et al. |
| 2007/0083913 A1 | 4/2007 | Griffin et al. |
| 2007/0104198 A1 | 5/2007 | Kalluri et al. |
| 2007/0133566 A1 | 6/2007 | Copps |
| 2007/0165627 A1 | 7/2007 | Sultan et al. |
| 2007/0214244 A1 | 9/2007 | Hitokoto et al. |
| 2007/0223372 A1 | 9/2007 | Haalen et al. |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031147 A1 | 2/2008 | Fieremans et al. |
| 2008/0031247 A1 | 2/2008 | Tahara et al. |
| 2008/0092213 A1 | 4/2008 | Wei et al. |
| 2008/0117827 A1 | 5/2008 | Matsumoto et al. |
| 2008/0120691 A1 | 5/2008 | Flewallen et al. |
| 2008/0147830 A1 | 6/2008 | Ridgill et al. |
| 2008/0151863 A1 | 6/2008 | Lawrence et al. |
| 2008/0172716 A1 | 7/2008 | Talpade et al. |
| 2008/0177896 A1 | 7/2008 | Quinn et al. |
| 2008/0196100 A1 | 8/2008 | Madhavan et al. |
| 2008/0196102 A1 | 8/2008 | Roesch |
| 2008/0225853 A1 | 9/2008 | Melman et al. |
| 2008/0243495 A1 | 10/2008 | Anandakumar et al. |
| 2008/0253366 A1 | 10/2008 | Zuk et al. |
| 2008/0253556 A1 | 10/2008 | Cobb et al. |
| 2008/0263665 A1 | 10/2008 | Ma et al. |
| 2008/0298330 A1 | 12/2008 | Leitch |
| 2008/0298360 A1 | 12/2008 | Wijnands et al. |
| 2008/0310421 A1 | 12/2008 | Teisberg et al. |
| 2009/0010153 A1 | 1/2009 | Filsfils et al. |
| 2009/0044005 A1 | 2/2009 | Komura et al. |
| 2009/0086629 A1 | 4/2009 | Zhang et al. |
| 2009/0094357 A1 | 4/2009 | Keohane et al. |
| 2009/0103566 A1 | 4/2009 | Kloth et al. |
| 2009/0106838 A1 | 4/2009 | Clark et al. |
| 2009/0122805 A1 | 5/2009 | Epps et al. |
| 2009/0144680 A1 | 6/2009 | Lehavot et al. |
| 2009/0188711 A1 | 7/2009 | Ahmad |
| 2009/0193103 A1 | 7/2009 | Small et al. |
| 2009/0232011 A1 | 9/2009 | Li et al. |
| 2009/0238179 A1 | 9/2009 | Samprathi |
| 2009/0249096 A1 | 10/2009 | Conner et al. |
| 2009/0249284 A1 | 10/2009 | Antosz et al. |
| 2009/0268614 A1 | 10/2009 | Tay et al. |
| 2009/0268617 A1 | 10/2009 | Wei et al. |
| 2010/0128619 A1 | 5/2010 | Shigei |
| 2010/0150155 A1 | 6/2010 | Napierala |
| 2010/0191612 A1 | 7/2010 | Raleigh |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0265849 A1 | 10/2010 | Harel |
| 2010/0281155 A1 | 11/2010 | Cipollone et al. |
| 2010/0287227 A1 | 11/2010 | Goel et al. |
| 2010/0290472 A1 | 11/2010 | Raman et al. |
| 2010/0299553 A1 | 11/2010 | Cen |
| 2010/0312875 A1 | 12/2010 | Wilerson et al. |
| 2011/0002339 A1 | 1/2011 | Fok |
| 2011/0007638 A1 | 1/2011 | Xu et al. |
| 2011/0093612 A1 | 4/2011 | Murakami |
| 2011/0110241 A1 | 5/2011 | Atkinson et al. |
| 2011/0138310 A1 | 6/2011 | Gomez et al. |
| 2011/0145657 A1 | 6/2011 | Bishop et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0173699 A1 | 7/2011 | Figlin et al. |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0228795 A1 | 9/2011 | Agrawal et al. |
| 2011/0239273 A1 | 9/2011 | Yang et al. |
| 2011/0249682 A1 | 10/2011 | Kean et al. |
| 2011/0268118 A1 | 11/2011 | Schlansker et al. |
| 2011/0273990 A1 | 11/2011 | Rajagopalan et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0054163 A1 | 3/2012 | Liu et al. |
| 2012/0063318 A1 | 3/2012 | Boddu et al. |
| 2012/0102114 A1 | 4/2012 | Dunn et al. |
| 2012/0163164 A1 | 6/2012 | Terry et al. |
| 2012/0163396 A1 | 6/2012 | Cheng et al. |
| 2012/0218896 A1 | 8/2012 | Ygberg et al. |
| 2012/0246307 A1 | 9/2012 | Malloy et al. |
| 2012/0275304 A1 | 11/2012 | Patel et al. |
| 2012/0300787 A1 | 11/2012 | Korger |
| 2012/0311621 A1 | 12/2012 | Foster et al. |
| 2013/0003732 A1 | 1/2013 | Dholakia et al. |
| 2013/0007879 A1 | 1/2013 | Esteban et al. |
| 2013/0019277 A1 | 1/2013 | Chang et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0122825 A1 | 5/2013 | Deforge et al. |
| 2013/0124708 A1 | 5/2013 | Lee et al. |

(56) References Cited

U.S. PATENT DOCUMENTS

| | | |
|---|---|---|
| 2013/0155846 A1 | 6/2013 | Ramachandran et al. |
| 2013/0182712 A1 | 7/2013 | Aguayo et al. |
| 2013/0242795 A1 | 9/2013 | Heen et al. |
| 2013/0250951 A1 | 9/2013 | Koganti et al. |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2013/0347105 A1 | 12/2013 | Nuemann et al. |
| 2014/0016501 A1 | 1/2014 | Kamath et al. |
| 2014/0047264 A1 | 2/2014 | Wang et al. |
| 2014/0052852 A1 | 2/2014 | Dufour et al. |
| 2014/0056298 A1 | 2/2014 | Vobbilisetty et al. |
| 2014/0064278 A1 | 3/2014 | Santos et al. |
| 2014/0068750 A1 | 3/2014 | Tjahjono et al. |
| 2014/0086253 A1 | 3/2014 | Yong |
| 2014/0101302 A1 | 4/2014 | Yang et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0258465 A1 | 9/2014 | Li |
| 2014/0269705 A1 | 9/2014 | Decusatis et al. |
| 2014/0269710 A1 | 9/2014 | Sundaram et al. |
| 2014/0269712 A1 | 9/2014 | Kidambi et al. |
| 2014/0280846 A1 | 9/2014 | Gourlay et al. |
| 2014/0294005 A1 | 10/2014 | Jain et al. |
| 2014/0307744 A1 | 10/2014 | Dunbar et al. |
| 2014/0321277 A1 | 10/2014 | Lynn, Jr. et al. |
| 2014/0334295 A1 | 11/2014 | Guichard et al. |
| 2014/0334304 A1 | 11/2014 | Zang et al. |
| 2014/0334317 A1 | 11/2014 | Atreya et al. |
| 2014/0341029 A1 | 11/2014 | Allan et al. |
| 2014/0372582 A1 | 12/2014 | Ghanwani et al. |
| 2014/0379915 A1 | 12/2014 | Yang et al. |
| 2015/0009992 A1 | 1/2015 | Zhang |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella et al. |
| 2015/0103679 A1 | 4/2015 | Tessmer et al. |
| 2015/0113143 A1 | 4/2015 | Stuart et al. |
| 2015/0124629 A1 | 5/2015 | Pani et al. |
| 2015/0124644 A1 | 5/2015 | Pani |
| 2015/0124806 A1 | 5/2015 | Banerjee et al. |
| 2015/0124823 A1 | 5/2015 | Pani et al. |
| 2015/0124824 A1 | 5/2015 | Edsall et al. |
| 2015/0124826 A1 | 5/2015 | Edsall et al. |
| 2015/0124833 A1 | 5/2015 | Ma et al. |
| 2015/0131445 A1 | 5/2015 | Nie et al. |
| 2015/0133201 A1 | 5/2015 | Szabo et al. |
| 2015/0188769 A1 | 7/2015 | Gu |
| 2015/0188770 A1 | 7/2015 | Naiksatann et al. |
| 2015/0222516 A1 | 8/2015 | Deval et al. |
| 2015/0236900 A1 | 8/2015 | Chung et al. |
| 2015/0249608 A1 | 9/2015 | Zhang et al. |
| 2015/0271104 A1 | 9/2015 | Chikkamath et al. |
| 2015/0280959 A1 | 10/2015 | Vincent |
| 2015/0288709 A1 | 10/2015 | Singhal et al. |
| 2015/0334632 A1 | 11/2015 | Rudolph et al. |
| 2015/0365314 A1 | 12/2015 | Hiscock et al. |
| 2015/0378712 A1 | 12/2015 | Cameron et al. |
| 2015/0378969 A1 | 12/2015 | Powell et al. |
| 2016/0006664 A1 | 1/2016 | Sabato et al. |
| 2016/0020993 A1 | 1/2016 | Wu et al. |
| 2016/0026631 A1 | 1/2016 | Salam et al. |
| 2016/0036636 A1 | 2/2016 | Erickson et al. |
| 2016/0080350 A1 | 3/2016 | Chaturvedi et al. |
| 2016/0099883 A1 | 4/2016 | Voit et al. |
| 2016/0119204 A1 | 4/2016 | Murasato et al. |
| 2016/0134563 A1 | 5/2016 | Yu et al. |
| 2016/0149751 A1 | 5/2016 | Pani et al. |
| 2016/0164748 A1 | 6/2016 | Kim |
| 2016/0173511 A1 | 6/2016 | Bratspiess et al. |
| 2016/0205069 A1 | 7/2016 | Blocher et al. |
| 2016/0241436 A1 | 8/2016 | Fourie et al. |
| 2016/0255118 A1 | 9/2016 | Wang |
| 2016/0267384 A1 | 9/2016 | Salam et al. |
| 2016/0315811 A1 | 10/2016 | Yadav et al. |
| 2016/0315814 A1 | 10/2016 | Thirumurthi et al. |
| 2016/0352566 A1 | 12/2016 | Mekkattuparamban et al. |
| 2016/0380892 A1 | 12/2016 | Mahadevan et al. |
| 2017/0034161 A1 | 2/2017 | Isola et al. |
| 2017/0063599 A1 | 3/2017 | Wu et al. |
| 2017/0093630 A1 | 3/2017 | Foulkes |
| 2017/0093750 A1 | 3/2017 | McBride et al. |
| 2017/0104636 A1 | 4/2017 | Vora et al. |
| 2017/0111259 A1 | 4/2017 | Wen et al. |
| 2017/0111360 A1 | 4/2017 | Hooda et al. |
| 2017/0126718 A1 | 5/2017 | Baradaran et al. |
| 2017/0126740 A1 | 5/2017 | Bejarano et al. |
| 2017/0134233 A1 | 5/2017 | Dong et al. |
| 2017/0142207 A1 | 5/2017 | Gupta et al. |
| 2017/0149637 A1 | 5/2017 | Banikazemi et al. |
| 2017/0155579 A1 | 6/2017 | Shih et al. |
| 2017/0163442 A1 | 6/2017 | Shen et al. |
| 2017/0163491 A1 | 6/2017 | Tonouchi |
| 2017/0195187 A1 | 7/2017 | Bennett et al. |
| 2017/0206129 A1 | 7/2017 | Yankilevich et al. |
| 2017/0207961 A1 | 7/2017 | Saxena et al. |
| 2017/0214619 A1 | 7/2017 | Chu et al. |
| 2017/0222898 A1 | 8/2017 | Acharya et al. |
| 2017/0237651 A1 | 8/2017 | Pani |
| 2017/0237667 A1 | 8/2017 | Wang |
| 2017/0237678 A1 | 8/2017 | Ma et al. |
| 2017/0250912 A1 | 8/2017 | Chu et al. |
| 2017/0257260 A1 | 9/2017 | Govindan et al. |
| 2017/0288948 A1 | 10/2017 | Singh et al. |
| 2017/0294088 A1 | 10/2017 | Patterson et al. |
| 2017/0317919 A1 | 11/2017 | Fernando et al. |
| 2017/0371692 A1 | 12/2017 | Connolly et al. |
| 2018/0034856 A1 | 2/2018 | Mallya |
| 2018/0212828 A1 | 7/2018 | Sekhri et al. |
| 2018/0270130 A1 | 9/2018 | Wang et al. |

FOREIGN PATENT DOCUMENTS

| | | |
|---|---|---|
| CN | 105471830 | 4/2016 |
| CN | 105721193 | 6/2016 |
| CN | 105721297 | 6/2016 |
| CN | 106130766 | 11/2016 |
| CN | 106603264 | 4/2017 |
| CN | 103701926 | 6/2017 |
| EP | 2431883 A2 | 3/2012 |
| EP | 2621136 | 7/2013 |
| EP | 3208721 A8 | 10/2017 |
| JP | 2007-267074 A | 10/2007 |
| WO | WO 2014/071996 | 5/2014 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |

(56) References Cited

FOREIGN PATENT DOCUMENTS

| WO | WO 2017/031922 | 3/2017 |
|---|---|---|
| WO | WO 2017/105452 | 6/2017 |

OTHER PUBLICATIONS

Author Unknown, "Aids to Pro-active Management of Distributed Resources through Dynamic Fault-Localization and Availability Prognosis," FaultLocalization-TR01-CADlab, May 2006, pp. 1-9.
Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.
Beyah, Raheem, et al., "Rogue Access Point Detection using Temporal Traffic Characteristics," In Global Telecommunications Conference, 2004, Globecom'04, IEEE, 2004, vol. 4, pp. 2271-2275.
Boucadair, M., et al., "Analysis of Solution Candidates to Reveal a Host Identifier (Host ID) in Shared Address Deployments," IETF INTAREA WG Internet-Draft draft-ietf-intarea-nat-reveal-analysis-05, Feb. 14, 2013, 22 pages.
Brocade Communications Systems, Inc., "Multi-Chassis Trunking for Resilient and High-Performance Network Architectures," White Paper, vvww_brocade.com, 2010, 8 pages.
Cisco Systems, Inc. "Intermediate System—to—Intermediate System (IS—IS) TLVs, Document ID 5739," updated Aug 10, 2005, 7 pages.
Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.
Cisco Systems, Inc., "Cisco Nexus 1000V VXLAN Configuration Guide, Release 4.2(1)SV2(2.1), Chapter 1, Information About VXLANs," Jun. 21, 2013, 6 pages.
Cisco Systems, Inc., "Design and Configuration Guide: Best Practices for Virtual Port Channels (vPC) on Cisco Nexus 7000 Series Switches," Revised Aug. 2014, 116 pages.
Cisco, "Cisco Fabric Path for Cisco Nexus 7000 Series Switches," White Paper, Sep. 7, 2011, 44 pages.
Cisco, "Cisco Fabric Path," At-A-Glance, 2010, 2 pages.
Cisco, "Cisco FabricPath Design Guide: Using Fabric Path with an Aggregation and Access Topology," Dec. 2011, 53 pages.
Cisco, "Verify Contracts and Rules in the ACI Fabric," Cisco, Updated Aug. 19, 2016, Document ID: 119023, pp. 1-20.
De Silva et al., "Network-wide Security Analysis," Semantic Scholar, Oct. 25, 2011, pp. 1-11.
Eastlake, D., et al., "Routing Bridges (RBridges): Adjacency," IETF, RFC 6327, Jul. 2011, 27 pages.
Eastlake, D., et al., "Transparent Interconnection of Lots of Links (TRILL) Use of IS—IS," IETF, RFC 6326, Jul. 2011, 26 pages.
Eastlake, Donald, et al., " RBridges: TRILL Header Options," <draft-ietf-trill-rbridge-options-00.txt>, TRILL Working Group, Internet-Draft, Dec. 24, 2009, 18 pages.
Eastlake, Eastlake, et al., "RBridges: Further TRILL Header Options," <draft-ietf-trill-rbrige-options-06.txt>, TRILL Working Group, Internet Draft, Dec. 1, 2011, 20 pages.
Fayaz, Seyed K., et al., "Efficient Network Reachability Analysis using a Succinct Control Plane Representation," 2016, ratul.org, pp. 1-16.
Feldmann, Anja, et al., "IP Network Configuration for Intradomain Traffic Engineering," Semantic Scholar, accessed on Jul. 20, 2017, pp. 1-27.
Han, Wonkyu, et al., "LPM: Layered Policy Management for Software-Defined Networks," Mar. 8, 2016, pp. 1-8.
Han, Yoonseon, et al., "An Intent-based Network Virtualization Platform for SDN," 2016 I FIP, pp. 1-6.
Kao, Kuo-Fong, et al. "A location-aware rogue AP detection system based on wireless packet sniffing of sensor APs" Abstract, 1 page, Proceedings of the 2011 ACM Symposium on Applied Computing, ACM , 2011.
Kazemian, Peyman, et al., "Real Time Network Policy Checking using Header Space Analysis," USENIX Association, 10th USENIX Symposium on Networked Systems Design and Implementation (NSDI'13) pp. 99-111.
Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.
Le, Franck, et al., "Minerals: Using Data Mining to Detect Router Misconfigurations," CyLab, Carnegie Mellon University, CMU-CyLab-06-008, May 23, 2006, pp. 1-14.
Leiserson, Charles E., "Fat-Trees: Universal Networks for Hardware-Efficient Supercomputing," IEEE Transactions on Computers, vol. c-34, No. 10, Oct. 1985, 10 pages.
Liang, Chieh-Jan Mike, et al., "SIFT: Building an Internet of Safe Things," Microsoft, IPSN' 15, Apr. 14-16, 2015, Seattle, WA, ACM 978, pp. 1-12.
Liu, Jason, et al., "A Real-Time Network Simulation Infrastructure Based on Open VPN," Journal of Systems and Software, Aug. 4, 2008, pp. 1-45.
Lopes, Nuno P., et al., "Automatically verifying reachability and well-formedness in P4 Networks," Microsoft, accessed on Jul. 18, 2017, pp. 1-13.
Mai, Haohui, et al., "Debugging the Data Plane with Anteater," SIGCOMM11, Aug. 15-19, 2011, pp. 1-12.
Miller, Nancy, et al., "Collecting Network Status Information for Network-Aware Applications," INFOCOM 2000, pp. 1-10.
Miranda, Joao Sales Henriques, "Fault Isolation in Software Defined Networks," www.gsd.inescid.pt, pp. 1-10.
Moon, Daekyeong, et al., "Bridging the Software/Hardware Forwarding Divide," Berkeley.edu, Dec. 18, 2010, pp. 1-15.
Onisick, Joe, "VXLAN Deep Dive," Genesis Framework, Wordpress, Nov. 6, 2012, 8 pages.
Perlman, R., et al., "Routing Bridges (RBridges): Base Protocol Specification," IETF, RFC 6325, Jul. 2011, 100 pages.
Perlman, Radia, et al., "Introduction to TRILL," The Internet Protocol Journal, vol. 14, No. 3, Sep. 2011, 19 pages.
Schaumann, Jan, "L3DSR—Overcoming Layer 2 Limitations of Direct Server Return Load Balancing," NANOG 51, Miami, Jan. 30, 2011, 33 pages.
Shetty, Sachin, et al., "Rogue Access Point Detection by Analyzing Network Traffic Characteristics," pp. 1-7.
Shin, Seugwon, et al., "FRESCO: Modular Composable Security Services for Software-Defined Networks," To appear in the ISOC Network and Distributed System Security Symposium, Feb. 2013, pp. 1-16.
Shukla, Apoorv, et al., "Towards meticulous data plane monitoring," kaust.edu.sa, access on Aug. 1, 2017, pp. 1-2.
Spijker, Rick Van't, "Dissertation Module for Master of Science—Mobile and Distributed Computer Networks," Leeds Metropolitan University, May 31, 2010, pp. 1-78.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security And Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA '07), Nov. 11-16, 2007, pp. 1-14.
Touch, J., et al., "Transparent Interconnection of Lots of Links (TRILL): Problem and Applicability Statement," Network Working Group, RFC 5556, May 2009, 18 pages.
VMware, Inc., "VMware Network Virtualization Design Guide, Technical White Paper," Jan. 2013, 25 pages.
Wikipedia®, "X-Forwarded-For," retrieved and printed from Internet Mar. 9, 2018, 4 pages; http://en.wikipedia.org/w/index.php?title=X-Forwarded-For&oldid=542207414.
Yourtchenko, D., et al., "Revealing hosts sharing an IP address using TCP option," Network Working Group Internet Draft draft-wing-nat-reveal-option-03.txt, Dec. 8, 2011, 10 pages.

(56) References Cited

OTHER PUBLICATIONS

Zhou, Shijie, et al., "High-Performance Packet Classification on GPU," 2014 IEEE, pp. 1-6.

VALIDATION OF A VIRTUAL PORT CHANNEL (VPC) ENDPOINT IN THE NETWORK FABRIC

CROSS REFERENCE TO RELATED APPLICATIONS

The instant application is a Continuation of, and claims priority to, U.S. patent application Ser. No. 15/662,496, entitled VALIDATION OF A VIRTUAL PORT CHANNEL (VPC) ENDPOINT IN THE NETWORK FABRIC, filed Jul. 28, 2017, which claims priority to U.S. Provisional Patent Application No. 62/521,661, entitled VALIDATION OF A VIRTUAL PORT CHANNEL (VPC) ENDPOINT IN THE NETWORK FABRIC, filed Jun. 19, 2017, the contents of each of which are herein incorporated by reference in their entireties.

TECHNICAL FIELD

The present technology pertains to network configuration assurance and troubleshooting, and more specifically to validating endpoint information for nodes in a network.

BACKGROUND

Network configurations for large data center networks are often specified at a centralized controller. The controller can program switches, routers, servers, and elements in the network according to the specified network configurations. Network configurations are inherently very complex, and involve low level as well as high level configurations of several layers of the network such as access policies, forwarding policies, routing policies, security policies, QoS policies, etc. Given such complexity, the network configuration process is error prone. In many cases, the configurations defined on a controller, which can reflect an intent specification for the network, can contain errors and inconsistencies that are often extremely difficult to identify and may create significant problems in the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
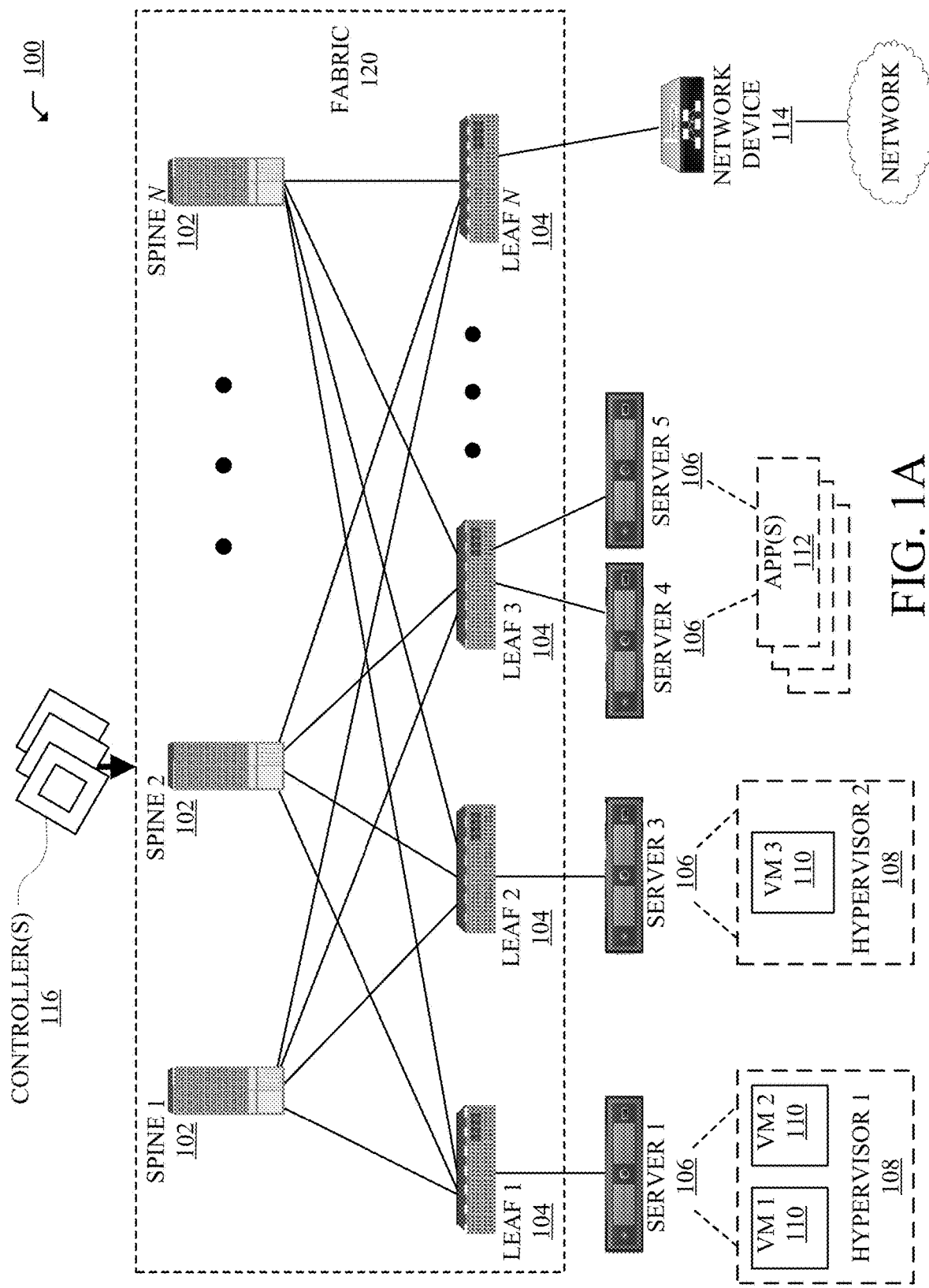
FIGS. 1A and 1B illustrate example network environments, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical, and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for network configuration, troubleshooting, and validating endpoint information for nodes in a network. A network assurance appliance is configured to retrieve, from a first leaf node in a network, first endpoint information for a first set of endpoints connected to the first leaf node, wherein the first set of endpoints includes a virtual port channel (VPC) endpoint. The network assurance appliance retrieves second endpoint information from a second node in the network, compares the first endpoint information with the second endpoint information, and identifies an inconsistency when the first endpoint information and the second endpoint information do not match.

Figure 1B:
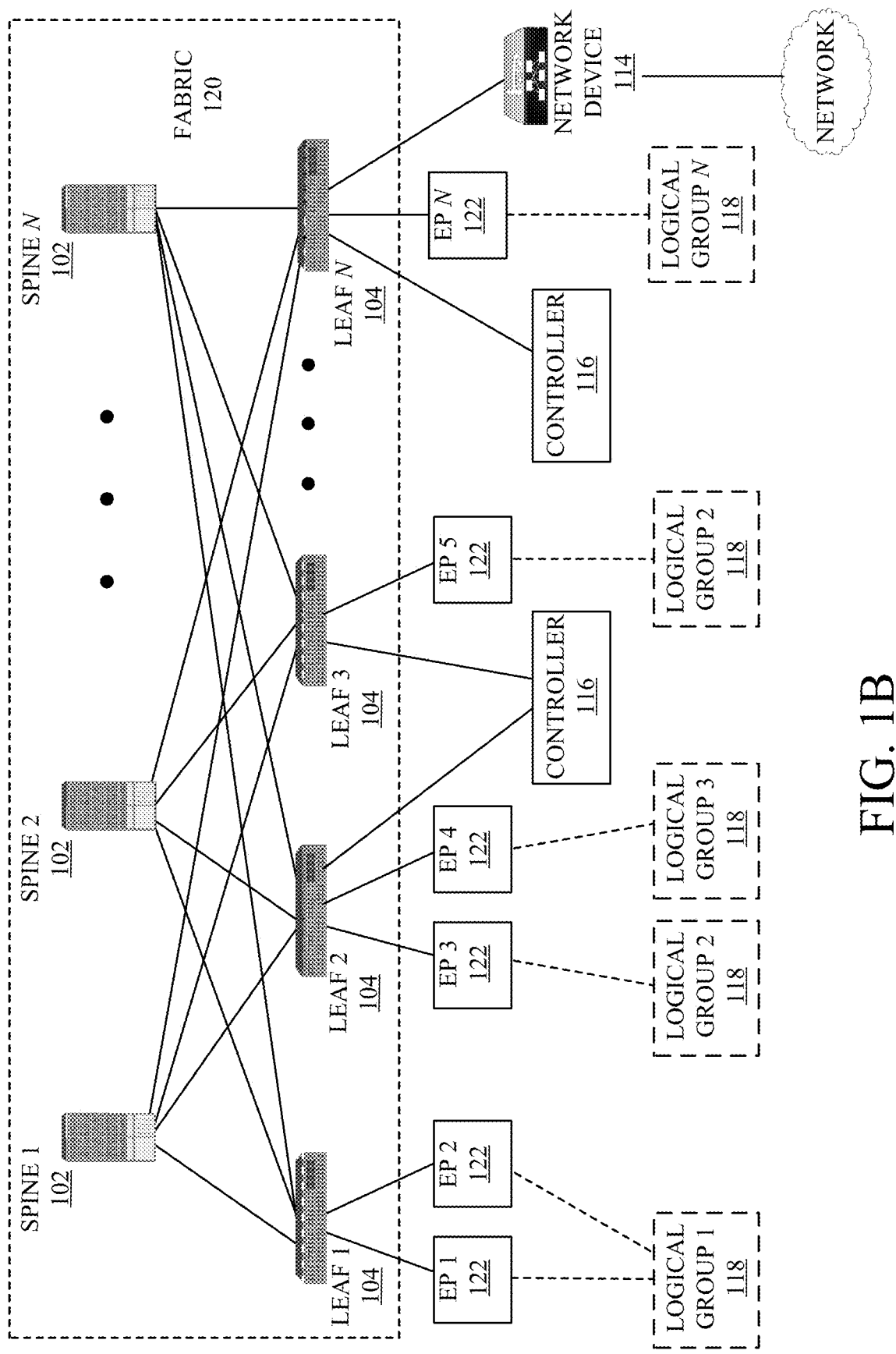
Figure 13:
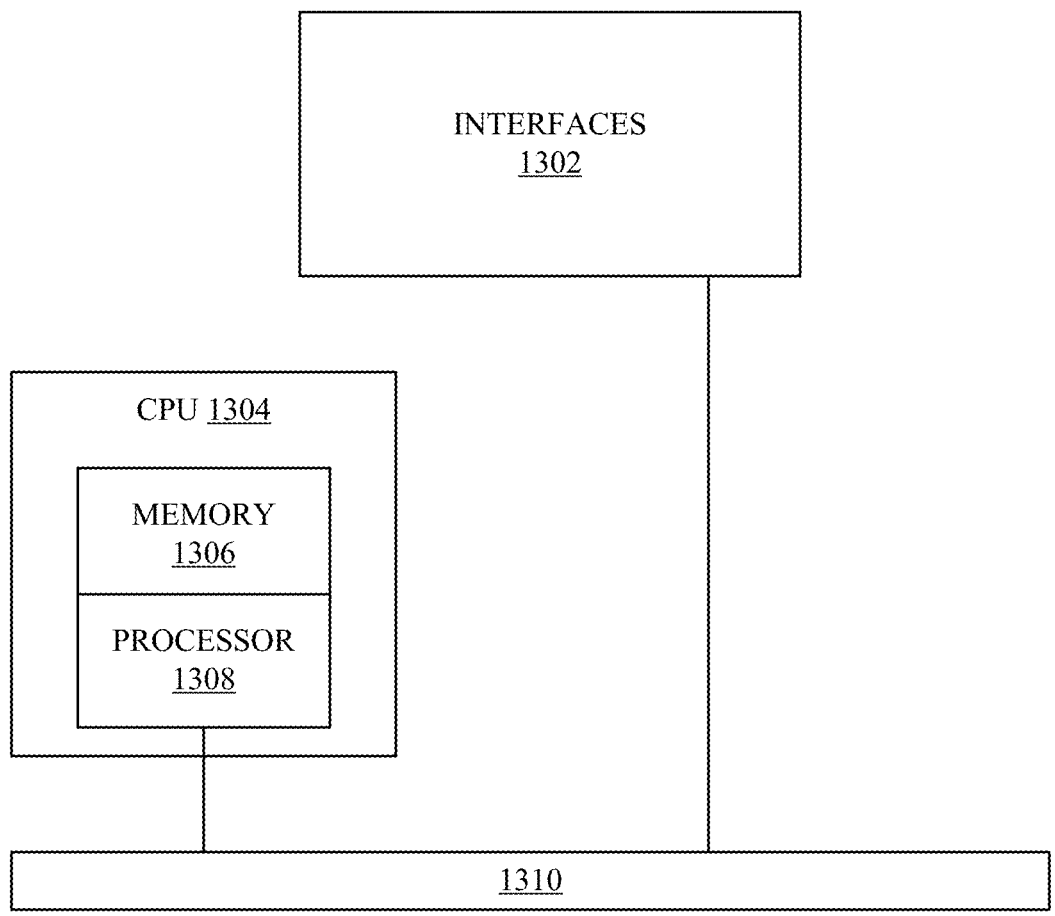
FIG. 13 illustrates an example network device in accordance with various embodiments.
Figure 14:
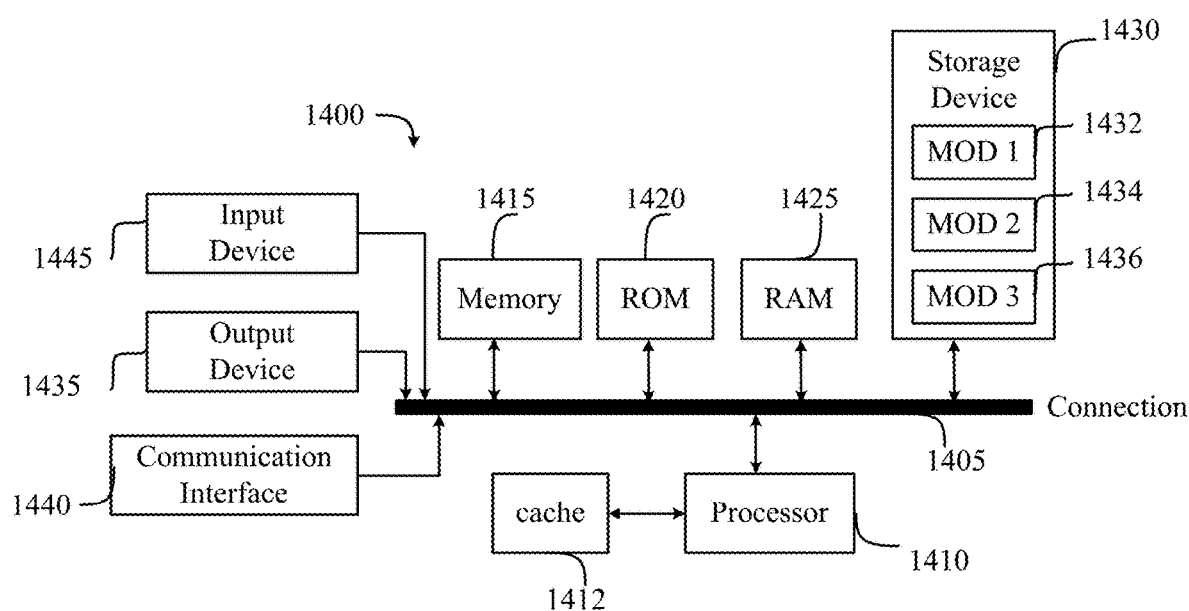
FIG. 14 illustrates an example computing device in accordance with various embodiments.

According to some aspects of the subject technology, a network assurance appliance is configured to retrieve endpoint information from a plurality of leaf nodes in a network, the endpoint information including a plurality of associations between leaf nodes and endpoints, determine that a number of leaf nodes in the plurality of leaf nodes in the network are associated with a VPC endpoint, and generate an event based on the determining Example Embodiments The disclosed technology addresses the need in the art validating endpoint information for nodes in a network. The present technology will be described in the following disclosure as follows. The discussion begins with an introductory discussion of network assurance and a description of example computing environments, as illustrated in FIGS. 1A and 1B. A discussion of network models for network assurance, as shown in FIGS. 2A through 2D, and network assurance systems and methods will then follow. The discussion concludes with a description of an example network device, as illustrated in FIG. 13, and an example computing device, as illustrated in FIG. 14, including example hardware components suitable for hosting software applications and performing computing operations. The disclosure now turns to an introductory discussion of network assurance.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a virtual extensible LAN (VXLAN) or software-defined network (SDN) (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant end point (EP) mobility, tenant policy, tenant routing, resources, etc.

Having described various aspects of network assurance, the disclosure now turns to a discussion of example network environments for network assurance.

FIG. 1A illustrates example network environments, in accordance with various aspects of the subject technology. In particular, FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a content delivery network (CDN) server, an intrusion defense system (IDS) or intrusion prevention system (IPS), a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations, and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security, and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), Network Virtualization using Generic Routing Encapsulation (NVGRE) Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database, and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, and database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates example network environments, in accordance with various aspects of the subject technology. In particular, FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
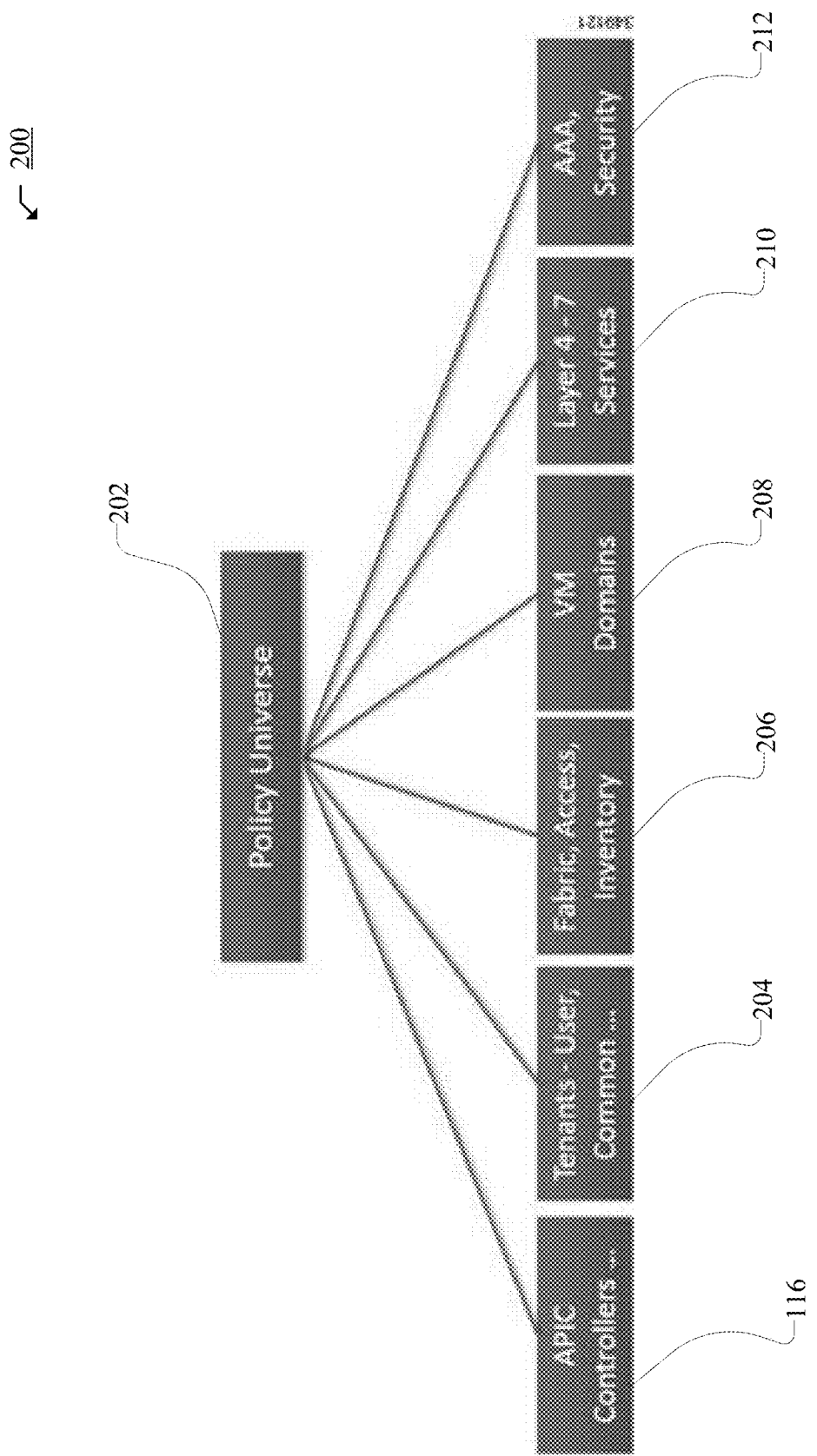
FIG. 2A illustrates an example object model for a network, in accordance with various aspects of the subject technology.

FIG. 2A illustrates an example object model for a network, in accordance with various aspects of the subject technology. In particular, FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
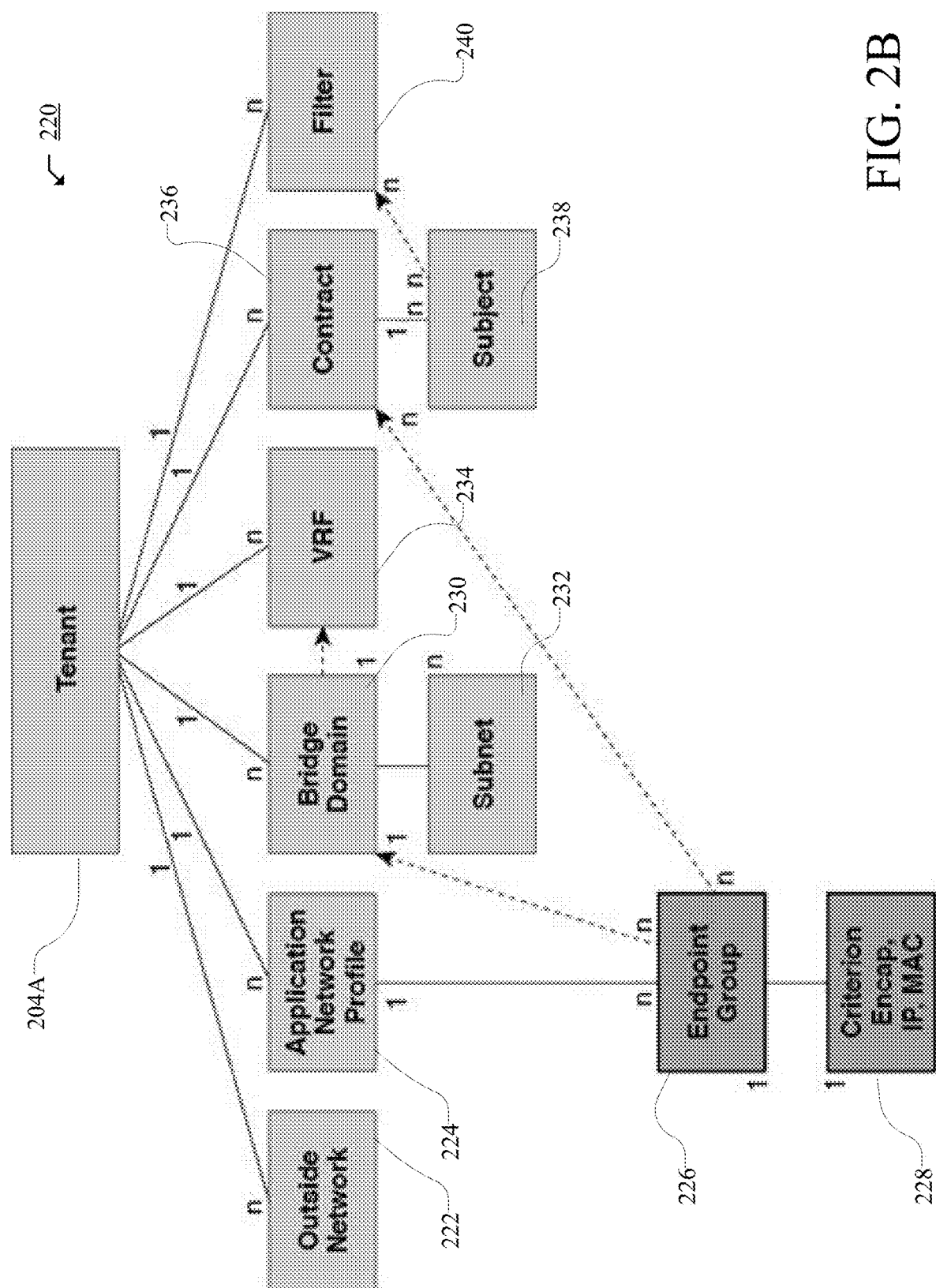
FIG. 2B illustrates an example object model for a tenant object in the example object model from FIG. 2A, in accordance with various aspects of the subject technology.

FIG. 2B illustrates an example object model for a tenant object, in accordance with various aspects of the subject technology. FIG. 2B includes an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization, or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
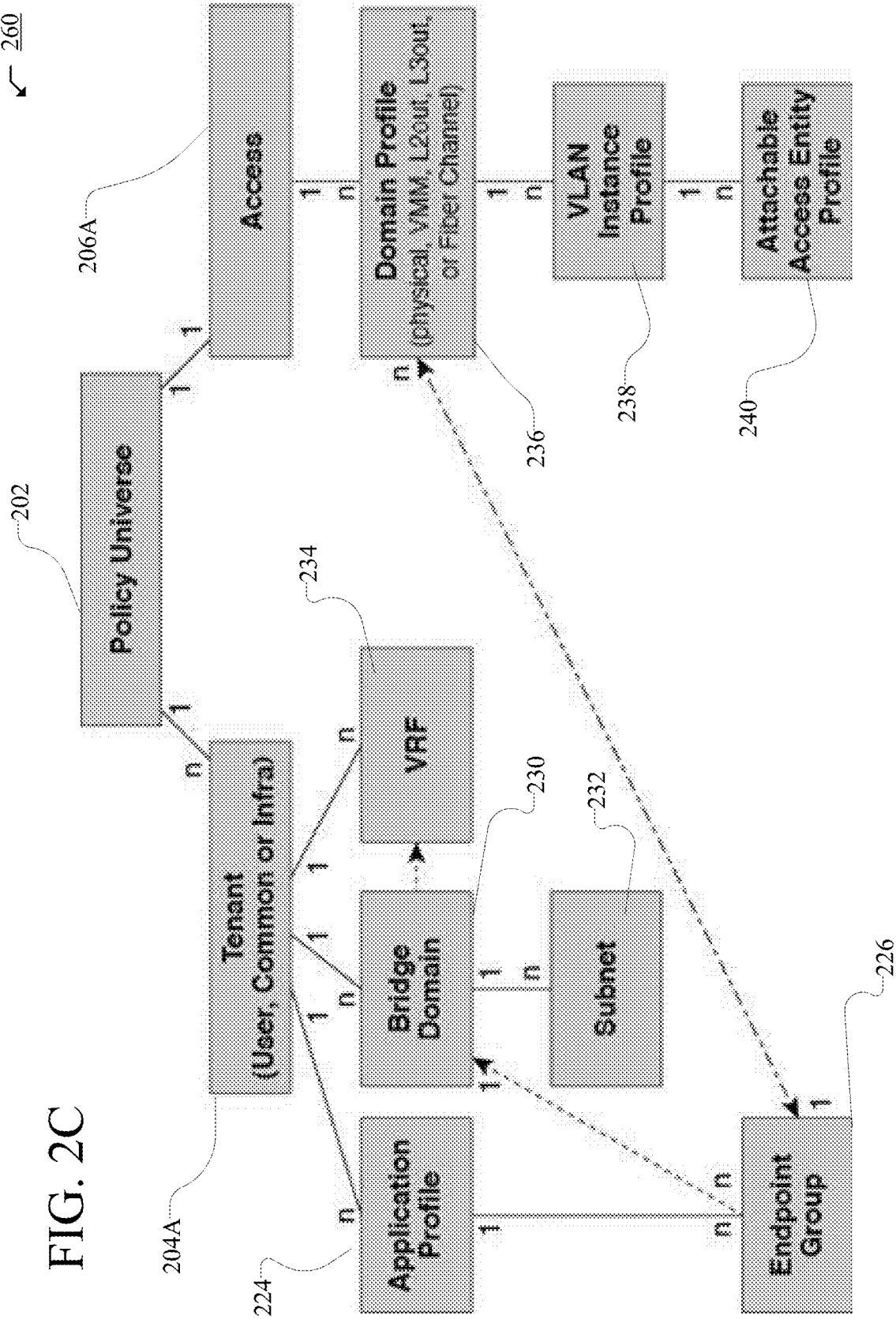
FIG. 2C illustrates an example association of various objects in the example object model from FIG. 2A, in accordance with various aspects of the subject technology.

FIG. 2C illustrates an example association of various objects, in accordance with various aspects of the subject technology. In particular, FIG. 2C includes an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
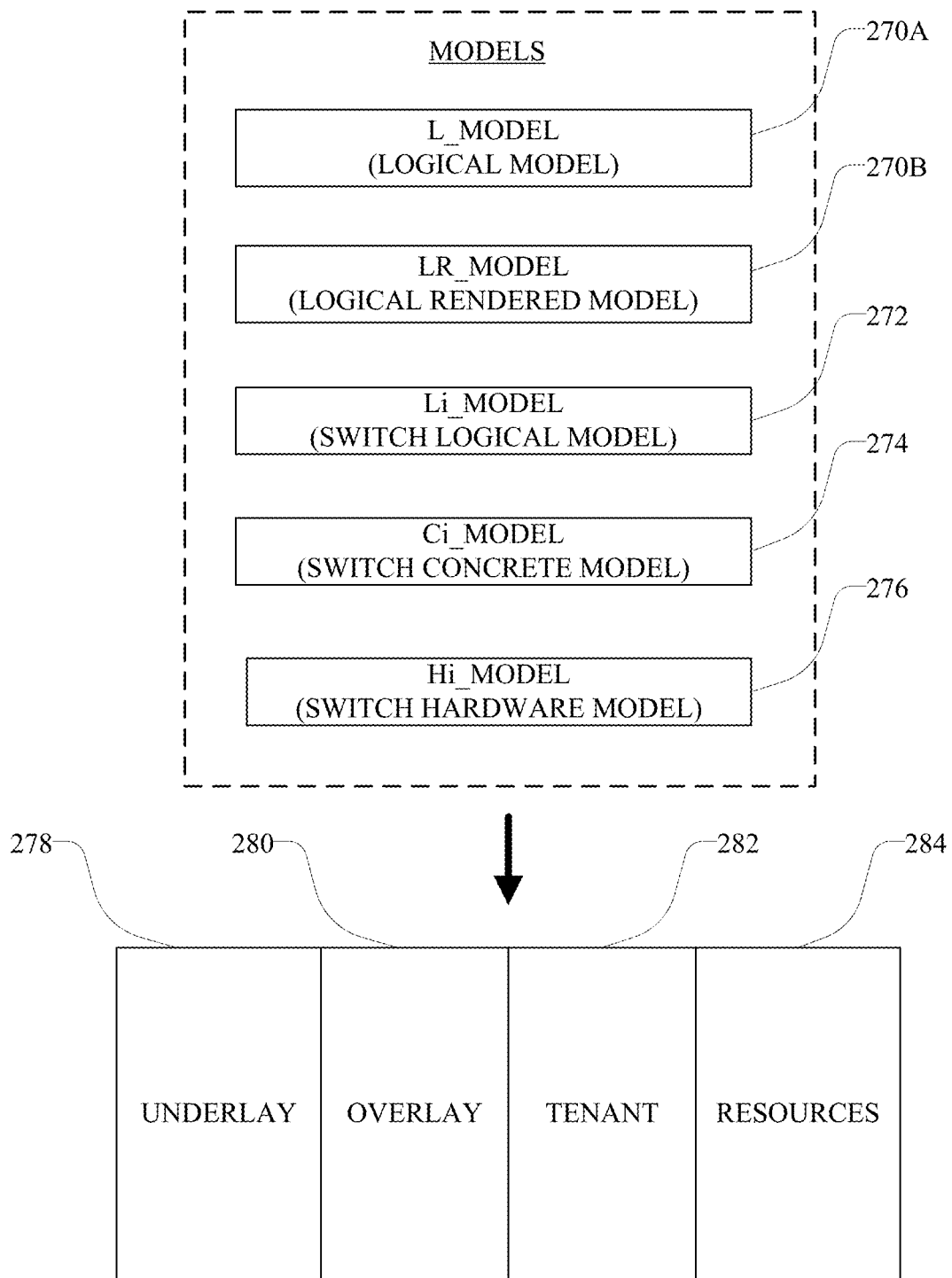
FIG. 2D illustrates a schematic diagram of example models for implementing the example object model from FIG. 2A, in accordance with various aspects of the subject technology.

FIG. 2D illustrates a schematic diagram of example models for implementing MIM 200. The network assurance models can include L_Model 270A (Logical Model), LR_Model 270B (Logical Rendered Model or Logical Runtime Model), Li_Model 272 (Logical Model for i), Ci_Model 274 (Concrete model for i), and Hi_Model 276 (Hardware model or TCAM Model for i).

L_Model 270A is the logical representation of the objects and their relationships in MIM 200. L_Model 270A can be generated by Controllers 116 based on configurations entered in Controllers 116 for the network, and thus represents the configurations of the network at Controllers 116. This is the declaration of the "end-state" expression that is desired when the elements of the network entities (e.g., applications) are connected and Fabric 120 is provisioned by Controllers 116. In other words, because L_Model 270A represents the configurations entered in Controllers 116, including the objects and relationships in MIM 200, it can also reflect the "intent" of the administrator: how the administrator wants the network and network elements to behave.

LR_Model 270B is the abstract model expression that Controllers 116 (e.g., APICs in ACI) resolve from L_Model 270A. LR_Model 270B can thus provide the elemental configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122.

Li_Model 272 is a switch-level or switch-specific model obtained from Logical Model 270A and/or Resolved Model 270B. For example, Li_Model 272 can represent the portion of L_Model 270A and/or LR_Model 270B pertaining to a specific switch or router i. To illustrate, Li_Model 272 $L_1$ can represent the portion of L_Model 270A and/or LR_Model 270B pertaining to Leaf 1 (104). Thus, Li_Model 272 can be generated from L_Model 270A and/or LR_Model 270B for one or more switch or routers (e.g., Leafs 104 and/or Spines 102) on Fabric 120.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 272, and/or Hi_Model 272 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi_Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
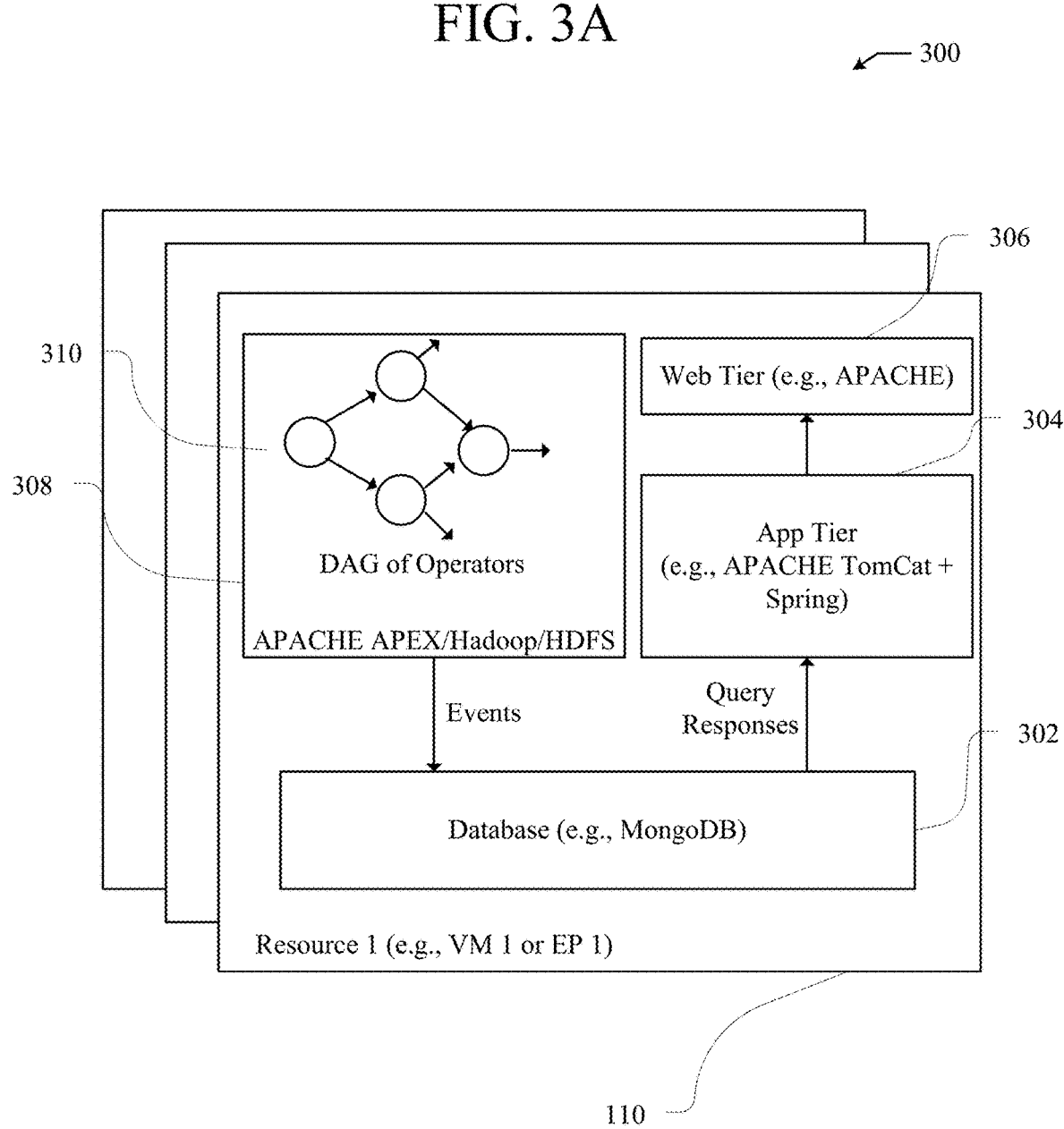
FIG. 3A illustrates an example network assurance appliance, in accordance with various aspects of the subject technology.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g., fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
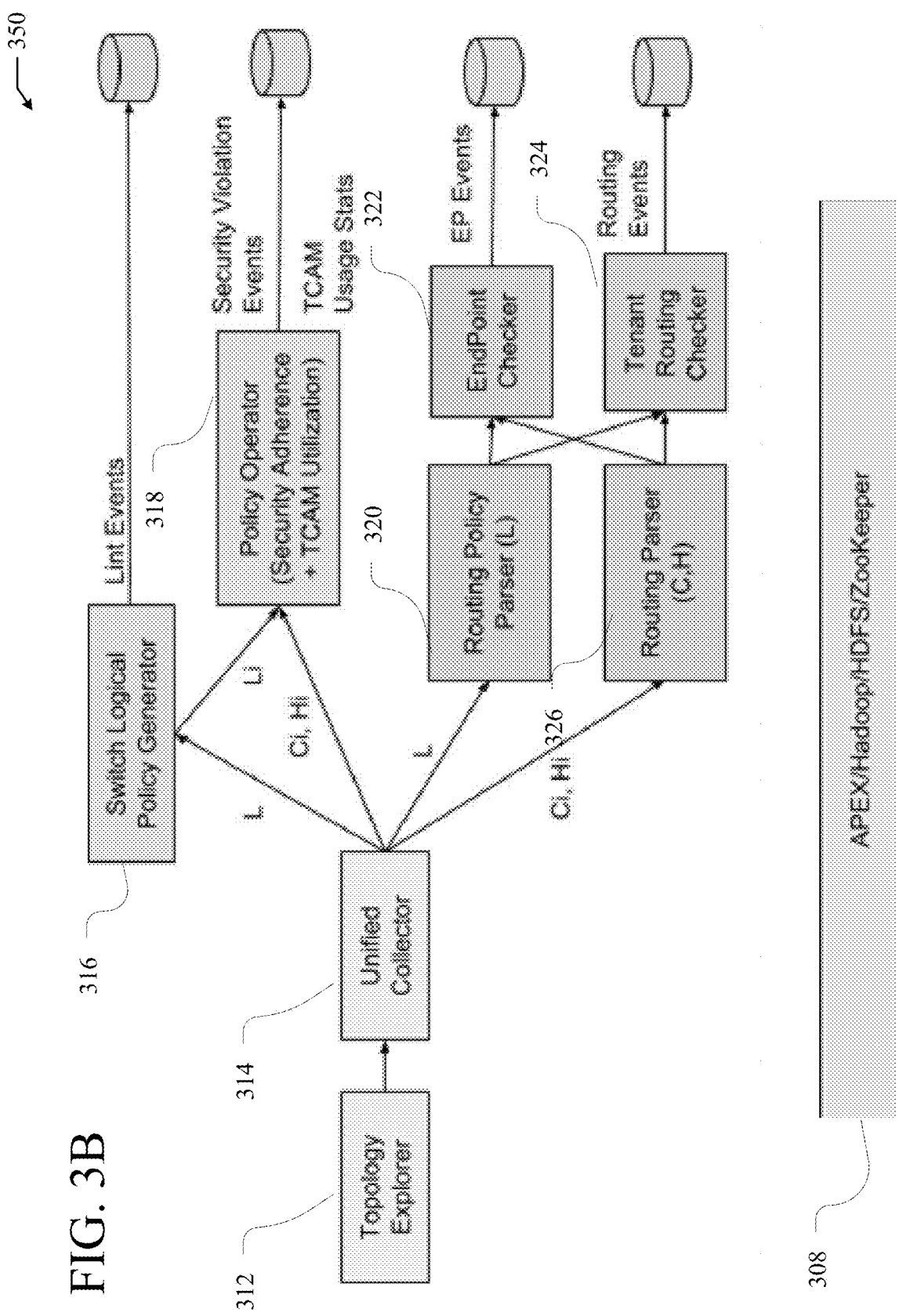
FIG. 3B illustrates an example system for network assurance, in accordance with various aspects of the subject technology.

FIG. 3B illustrates an architectural diagram of an example system 350 for network assurance. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

Unified Collector 314 can receive the topological view from Topology Explorer 312 and use the topology information to collect information for network assurance from Fabric 120. Such information can include L_Model 270A and/or LR_Model 270B from Controllers 116, switch software configurations (e.g., Ci_Model 274) from Leafs 104 and/or Spines 102, hardware configurations (e.g., Hi_Model 276) from Leafs 104 and/or Spines 102, etc. Unified Collector 314 can collect Ci_Model 274 and Hi_Model 276 from individual fabric members (e.g., Leafs 104 and Spines 102).

Unified Collector 314 can poll the devices that Topology Explorer 312 discovers in order to collect data from Fabric 120 (e.g., from the constituent members of the fabric). Unified Collector 314 can collect the data using interfaces exposed by Controller 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH LC shell for accessing runtime state of the line card.

Unified Collector 314 can poll other information from Controllers 116, including: topology information, tenant forwarding/routing information, tenant security policies, contracts, interface policies, physical domain or VMM domain information, OOB (out-of-band) management IP's of nodes in the fabric, etc.

Unified Collector 314 can also poll other information from Leafs 104 and Spines 102, such as: Ci Models 274 for VLANs, BDs, security policies, Link Layer Discovery Protocol (LLDP) connectivity information of Leafs 104 and/or Spines 102, endpoint information from EPM/COOP, fabric card information from Spines 102, routing information base (RIB) tables, forwarding information base (FIB) tables from Leafs 104 and/or Spines 102, security group hardware tables (e.g., TCAM tables) from switches, etc.

Assurance Appliance 300 can run one or more instances of Unified Collector 314. For example, Assurance Appliance 300 can run one, two, three, or more instances of Unified Collector 314. The task of data collecting for each node in the topology (e.g., Fabric 120 including Spines 102, Leafs 104, Controllers 116, etc.) can be sharded or load balanced, to a unique instance of Unified Collector 314. Data collection across the nodes can thus be performed in parallel by one or more instances of Unified Collector 314. Within a given node, commands and data collection can be executed serially. Assurance Appliance 300 can control the number of threads used by each instance of Unified Collector 314 to poll data from Fabric 120.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A for each switch.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
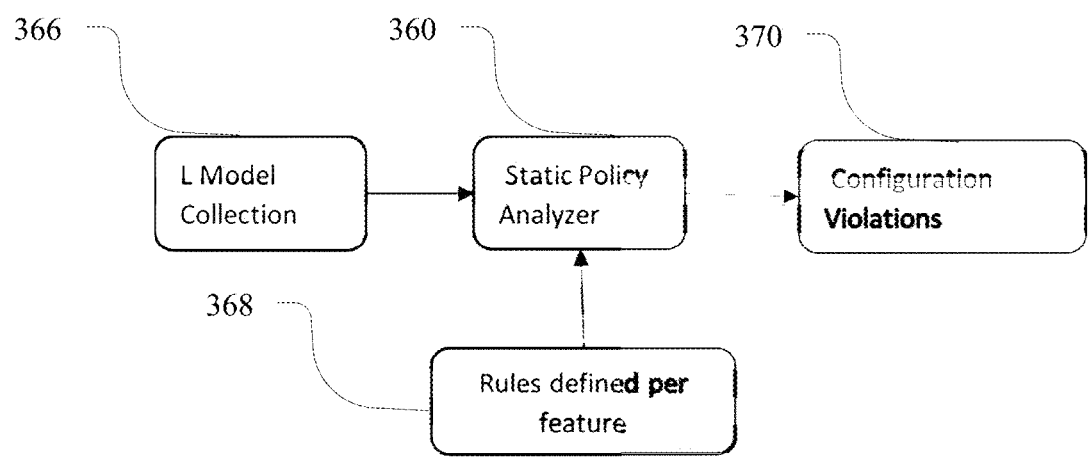
FIG. 3C illustrates a schematic diagram of an example system for static policy analysis in a network, in accordance with various aspects of the subject technology.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/issues, etc. Rules 368 can define conditions which may result in aliased rules, conflicting rules, etc. To illustrate, Rules 368 can specify that an allow policy for a specific communication between two objects can conflict with a deny policy for the same communication between two objects if the allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

Figure 4:
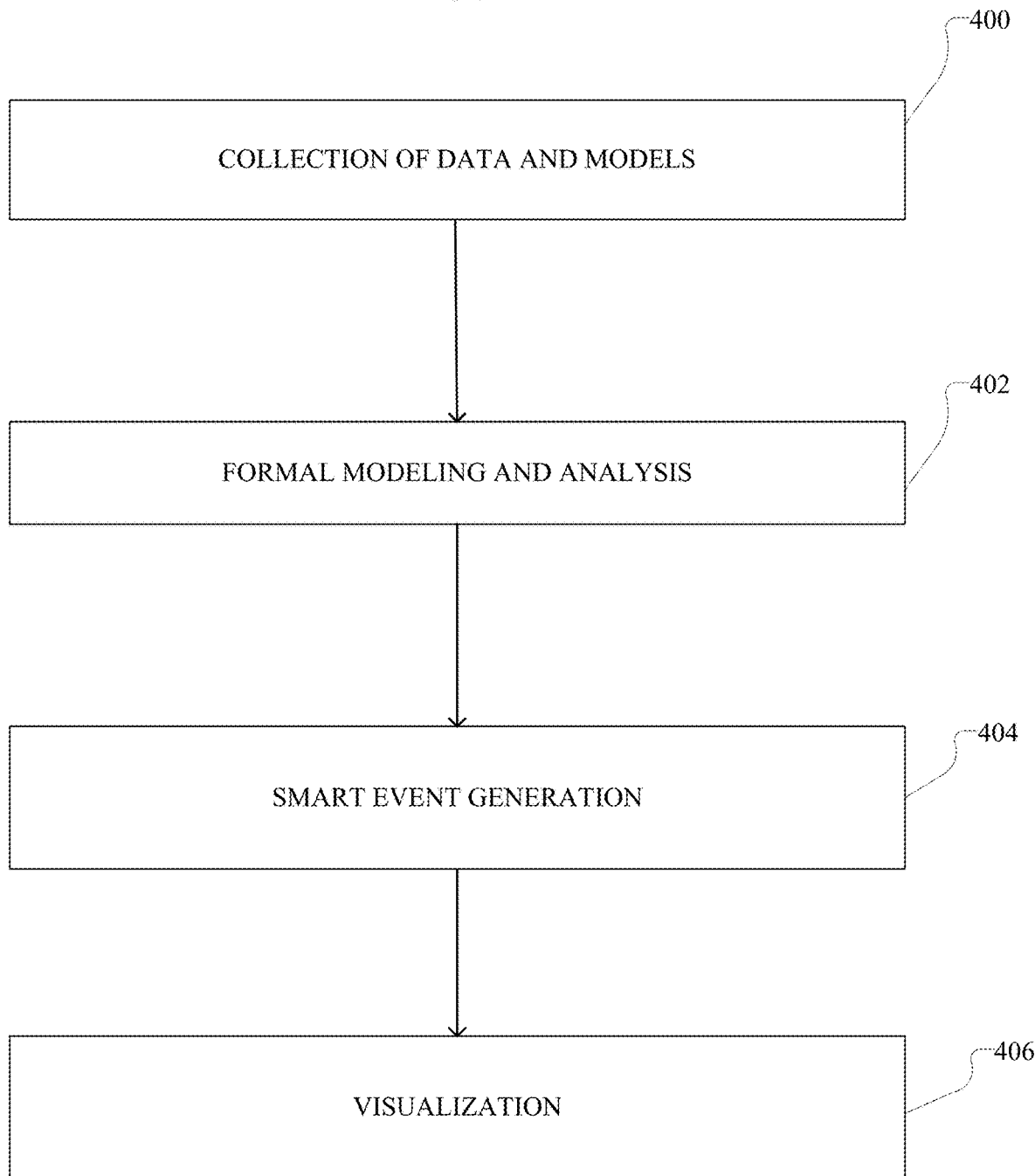
FIG. 4 illustrates an example method embodiment for network assurance, in accordance with various aspects of the subject technology.

FIG. 4 illustrates a flowchart for an example network assurance method. The methods illustrated herein are provided by way of example, as there are a variety of ways to carry out the various methods disclosed. Additionally, while the example methods are illustrated with a particular order of blocks, operations, or steps, those of ordinary skill in the art will appreciate that the blocks, operations, or steps can be executed in any order and can include fewer or more blocks, operations, or steps than illustrated.

Each block, operation, or step shown in FIG. 4 represents one or more steps, processes, methods, or routines in the methods. For the sake of clarity and explanation purposes, the FIG. 4 is described with reference to Assurance Appliance 300, Models 270A-B, 272, 274, 276, and Network Environment 100, as shown in FIGS. 1A-B, 2D, and 3A.

At step 400, Assurance Appliance 300 can collect data and obtain models associated with Network Environment 100. The models can include Models 270A-B, 272, 274, 276. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 402, Assurance Appliance 300 can analyze and model the received data and models. For example, Assurance Appliance 300 can perform formal modeling and analysis, which can involve determining equivalency between models, including configurations, policies, etc.

At step 404, Assurance Appliance 300 can generate one or more smart events. Assurance Appliance 300 can generate smart events using deep object hierarchy for detailed analysis, such as Tenants, switches, VRFs, rules, filters, routes, prefixes, ports, contracts, subjects, etc.

At step 406, Assurance Appliance 300 can visualize the smart events, analysis, and/or models. Assurance Appliance 300 can display problems and alerts for analysis and debugging, in a user-friendly GUI.

According to various aspects of the subject technology, network assurance activities for endpoints in a network may involve collecting information from various sources in the network and performing one or more endpoint checks or network assurance checks. The information may be collected from one or more network controllers (e.g., an APIC controller), network administrators, services, data stores, endpoints, leaf nodes, and/or spine nodes. The information collected may include data from the concrete model, logical model, or hardware model. For example, a network assurance appliance may query a network controller to obtain topology information for a network, query concrete model information from one or more nodes in the network, and/or collect logical model information from the controller.

In some cases, an endpoint may connect to a leaf node and the leaf node will learn information about the endpoint. The learned information may include, for example, an interface identifier on which the endpoint connects to the leaf node, an endpoint group that the endpoint belongs to, VLAN information, encapsulation information, etc. The leaf node may publicize the route to the newly connected endpoint to inform the other nodes in the network that communication to the new endpoint is through that leaf node. This endpoint may be considered a learned endpoint. In other situations, an endpoint may be a static endpoint that, instead of being learned, is specified by a network controller based on a logical model.

The endpoint checking functionality of the network assurance appliance validates endpoint information. In some applications, the network assurance appliance collects information about endpoints in the network, sorts that information, and validates that the information about the endpoints is consistent across nodes (e.g., leaf nodes and spine nodes). For example, data from the local search (LST) table that includes layer 2 and/or layer 3 information may be collected from leaf nodes and corresponding information may be collected from spine nodes. The information may be combined and compared to identify inconsistencies or mismatches.

If inconsistencies or mismatches are found, the network assurance appliance may generate an event, notify a network administrator of the event, log the event, and/or attempt to resolve the issue. According to other aspects, information from other routing tables (LPM table, GST table, etc.) maintained by the nodes may also be explored to identify inconsistencies or mismatches. There may be various causes for inconsistencies and mismatches in endpoint information across the network. For example, problems may be caused by a spine or leaf malfunction or reboot, a node dropping off and coming back on, a problem with various communication including controller to leaf communication or route learning protocols.

Figure 5:
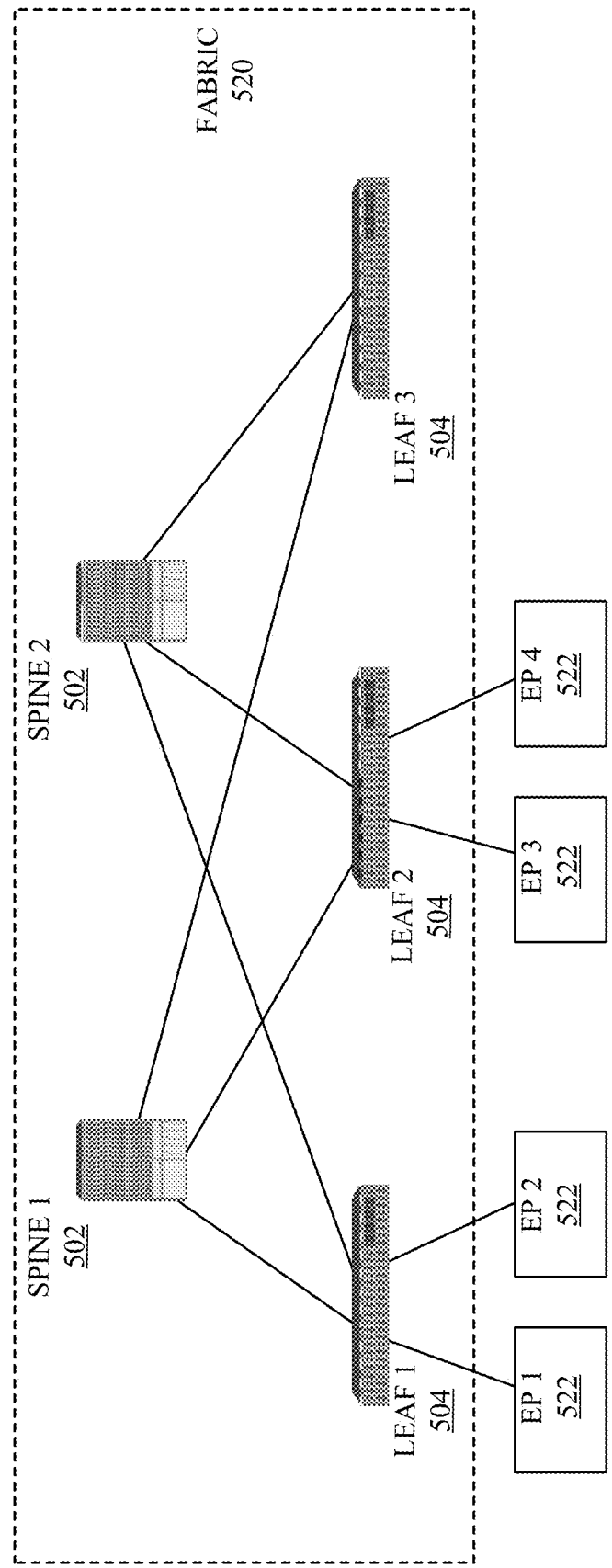
FIG. 5 illustrates an example network environment, in accordance with various aspects of the subject technology.

FIG. 5 illustrates an example network environment, in accordance with various aspects of the subject technology. In this example, network environment 500 includes endpoints 522 connected to leafs 504 in fabric 520. Fabric 520 can include spines 502 (e.g., spine routers or switches) and leafs 504 (e.g., leaf routers or switches) which can be interconnected for routing or switching traffic in the fabric 520. Spines 502 can interconnect leafs 504 in the fabric 520, and leafs 504 can connect the fabric 520 to an overlay or logical portion of the network environment 500, which can include application services, servers, virtual machines, containers, endpoints, etc. Thus, network connectivity in the fabric 520 can flow from spines 502 to leafs 504, and vice versa. The interconnections between leafs 504 and spines 502 can be redundant (e.g., multiple interconnections) to avoid a failure in routing. In some embodiments, leafs 504 and spines 502 can be fully connected, such that any given leaf is connected to each of the spines 502, and any given spine is connected to each of the leafs 504.

As suggested above, the network assurance appliance may collect information about the endpoints from spine nodes 502. The information collected from the spines 502 in the fabric 520 may be combined and stored. A simplified representation of the combined data collected by the network assurance appliance is illustrated in the table below:

TABLE 1

| EP1 | EP2 | EP3 | EP4 |
|---|---|---|---|
| Spine1 | Spine1 | Spine1 | Spine1 |
| Spine2 | Spine2 | Spine2 | Spine2 |

The combined data indicates that endpoint 1 (EP1) is reachable by spine 1 and spine 2, endpoint 2 (EP2) is reachable by spine 1 and spine 2, endpoint 3 (EP3) is reachable by spine 1 and spine 2, endpoint 4 (EP4) is reachable by spine 1 and spine 2. Each spine in the fabric 520 should have information about all endpoints 522 in the fabric since a leaf may route traffic towards any spine.

The network assurance appliance may also collect information about the endpoints in the fabric 520 from the leafs 504. The information collected from the leafs 504 in the fabric 520 may be combined and stored. A simplified representation of the combined data collected from the leafs 504 may be:

TABLE 2

| EP1 | EP2 | EP3 | EP4 |
|---|---|---|---|
| Leaf1 | Leaf1 | Leaf2 | Leaf2 |

The combined data collected from the leafs 504 indicates that endpoint 1 (EP1) is reachable via leaf 1, endpoint 2 (EP2) is reachable via leaf 1, endpoint 3 (EP3) is reachable via leaf 2, and endpoint 4 (EP4) is reachable via leaf 2. In various aspects of the subject technology, the network assurance appliance collects additional information from the spines 502 and leafs 504 that is not included in the simplified representations above. This additional information may include, for example, tunnel endpoint (TEP) addresses, IP addresses, MAC addresses, bridge domain (BD) information, endpoint group (EPG) information, L3out information, VRF information, various endpoint flags/properties, or other information associated with the endpoints 522.

The routing information collected a leaf node may be considered, in some situations, to be a source of truth for endpoint information for endpoints that are connected to the leaf node. The endpoint information may be compared with endpoint information collected from the spine nodes 502 in the fabric 520. The endpoint information in the spine nodes 502 is typically derived from information publicized by one or more leaf nodes 504 in the network and is stored in various routing tables, lookup tables, or other data stores on the spine nodes 502.

Validating Endpoint Configurations Between Nodes

Figure 6:
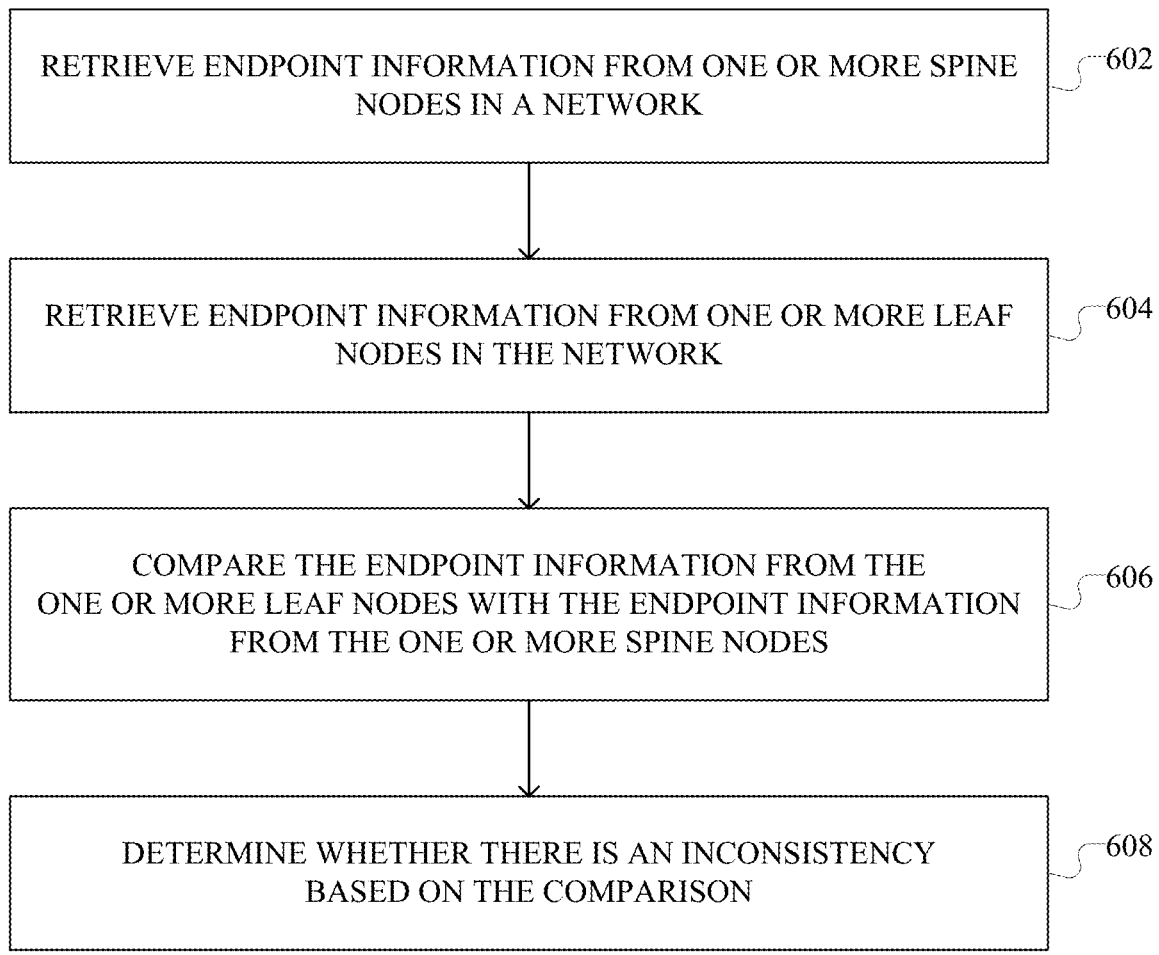
FIG. 6 illustrates an example method embodiment for validating an endpoint configuration between nodes, in accordance with various aspects of the subject technology.

FIG. 6 illustrates an example method embodiment for validating an endpoint configuration between nodes, in accordance with various aspects of the subject technology. At operation 602, the network assurance appliance may retrieve endpoint information from one or more spine nodes in a network fabric. The endpoint information includes routing and other network information about endpoints in the network. The information retrieved from the one or more spine nodes may be combined into a single set of data for the spine nodes. At operation 604, the network assurance appliance may retrieve endpoint information from one or more leaf nodes in the network fabric. This information may similarly be combined into a set of data for the leaf nodes.

At operation 606, the network assurance appliance may compare the endpoint information from the one or more leaf nodes with the endpoint information from the one or more spine nodes and, at operation 608, determine whether there is an inconsistency based on the comparison. An inconsistency may indicate erroneous endpoint information stored on one of the nodes in the fabric and, in response, the network assurance appliance may generate an event, notify a network administrator of the event, log the event, and/or attempt to resolve the issue.

Although the method in FIG. 6 discusses comparing combined endpoint information from leaf nodes with combined endpoint information from spine nodes, other comparisons may also be performed by the network assurance appliance including, for example, comparisons of endpoint information between spine nodes, comparisons of endpoint information between leaf nodes, and/or comparisons of endpoint information between from single nodes.

Check that all Detected Endpoints are Known to all Spines

The network assurance appliance may use the method of FIG. 6 to check for various inconsistencies. For example, a check to make sure that all endpoints are known to all spines in the fabric may be performed. More specifically, the network assurance appliance checks whether all endpoints detected by the leaf nodes are also known to each spine in the fabric. As discussed above, the endpoint information may be retrieved from the leaf nodes in the fabric and specify the endpoints detected by the leaf nodes in the network.

A simplified representation of the endpoint information collected from the leaf nodes is illustrated in the table below:

TABLE 3

| EP1 | EP2 | EP3 | EP4 |
|---|---|---|---|
| Leaf1 | Leaf1 | Leaf2 | Leaf2 |

The endpoint information from the leaf nodes indicates that endpoints EP1 and EP2 are connected to leaf node 1 and that endpoints EP3 and EP4 are connected to leaf node 2. The leaf nodes enable the various endpoints EP1-EP4 connected to them to transmit data through the network fabric and allow other endpoints to reach the connected endpoint.

For illustrative purposes, the endpoint information collected from the spine nodes in one scenario may be illustrated in the table below:

TABLE 4

| EP1 | EP2 | EP3 | EP4 |
|---|---|---|---|
| Spine1 | Spine1 | Spine1 | Spine1 |
| Spine2 | Spine2 | Spine2 | Spine2 |

The network assurance appliance may compare the endpoint information collected from the leaf nodes with the endpoint information collected from the spine nodes and determine whether there is an inconsistency based on the comparison. More specifically, the network assurance appliance may compare the information in Table 3 and Table 4 above and determine that there is no inconsistency because all endpoints detected by the leaf nodes are known to each and every spine node in the fabric.

In another illustrative scenario, the endpoint information collected from the spine nodes can be represented by Table 5 below:

TABLE 5

| EP1 | EP2 | EP3 | ~~EP4~~ |
|---|---|---|---|
| Spine1 | Spine1 | Spine1 | ~~Spine1~~ |
| Spine2 | Spine2 | Spine2 | ~~Spine2~~ |

The network assurance appliance may compare the information in Table 3 and Table 5 above and determine that there is an inconsistency because EP4, which has been detected by leaf node 2 (see Table 3), is not known to either spine node according to the information in Table 5.

Similarly, in another illustrative scenario, the endpoint information collected from the spine nodes can be represented by Table 6 below:

TABLE 6

| EP1 | EP2 | EP3 | EP4 |
|---|---|---|---|
| Spine1 | Spine1 | Spine1 | Spine1 |
| Spine2 | Spine2 | Spine2 | ~~Spine2~~ |

Again, network assurance appliance may compare the information in Table 3 and Table 6 above and determine that there is an inconsistency because EP4, which has been detected by leaf node 2, is not known to spine node 2 (although it is known to spine node 1). If any such inconsistency is detected, the network assurance appliance may generate an event, notify a network administrator of the event, log the event, and/or attempt to resolve the issue (e.g., restart a malfunctioning node, etc.).

Check for Flag and IP Inconsistencies

The endpoint information retrieved by the network assurance appliance may include additional information such as MAC addresses, TEP addresses, IP addresses, subnet information, bridge domain (BD) information, endpoint group (EPG) information, L3out information, VRF information, various endpoint flags, or other information associated with the endpoints. The various endpoint flags include, for example, is_host flags, is_router flags, is_vpc flags, scope_ID flags, PC_tag flags, and other flags used to specify information for endpoints on a network. These flags may depend on the implementation of the network.

In addition to or alternatively, the network assurance appliance may also check whether the flags in the endpoint information retrieved from the spines and the flags in the endpoint information retrieved from the leafs are consistent. If any such inconsistency is detected, the network assurance appliance may generate an event, notify a network administrator of the event, log the event, and/or attempt to resolve the issue (e.g., restart a malfunctioning node, execute an endpoint learning process, etc.).

In addition to or alternatively, the network assurance appliance may also check whether the IP address information in the endpoint information retrieved from the spines and the IP address information in the endpoint information retrieved from the leafs are consistent. For example, endpoint information maintained by a leaf node or a spine node may include a bridge domain ID, a MAC address, and one or more IP addresses. For endpoints that include one or more virtual machines, multiple IP addresses may be needed. The network assurance appliance validates the number and value of the various IP addresses for an endpoint detected by a leaf node and the number and value of the various IP addresses for the endpoint from the endpoint information retrieved from the spine nodes. If an inconsistency is detected, the network assurance appliance may generate an event, notify a network administrator of the event, log the event, and/or attempt to resolve the issue (e.g., restart a malfunctioning node, execute an endpoint learning process, etc.).

Check that Each Endpoint Found by the Spine Nodes are Connected to a Leaf

The network assurance appliance may perform a check to determine whether each endpoint found in the endpoint information from the one or more spine nodes is connected to a leaf node. For example, for each endpoint identified in the endpoint information retrieved from the spine nodes, the network assurance appliance may check to make sure the endpoint is also in the endpoint information retrieved from the leaf nodes. If the endpoint is not found in the endpoint information from the leaf nodes, there is an inconsistency.

Check that Each Endpoint is Only Connected to One Leaf (e.g., Endpoint Consistency Check)

The network assurance appliance may also perform a check to determine whether each endpoint is only connected to one leaf node. In some network configurations, endpoints may only be connected to one leaf node unless they are configured otherwise (e.g., VPC endpoints or pervasive endpoints). For the endpoints that are to be connected to one leaf node, checks are performed that only one leaf node detects each endpoint.

According to some aspects of the subject technology, the network assurance appliance may retrieve endpoint information from the leaf nodes in the network and determine whether an endpoint is detected by more than one leaf node. If more than one leaf node detects an endpoint, and the endpoint is not a specialized endpoint configured to connect to more than one leaf node (e.g., VPC endpoints or pervasive endpoints), the network assurance appliance may determine there is an inconsistency.

Duplicate IP Check

The network assurance appliance may perform a check to determine whether there are any duplicate IPs in a VRF. For example, for each VRF, the network assurance appliance may check to make sure the IP addresses for the endpoint in the endpoint information retrieved from the nodes are unique and are not identical with another IP address for an endpoint in the VRF. If a duplicate IP address is found, there is a misconfiguration.

Validating Tunnel Endpoint Addresses in a Network Fabric

Tunnel endpoint (TEP) addresses are used to route traffic through the fabric in ACI networks and other similar networks. Each node may be assigned a physical TEP address and use the TEP addresses of other nodes in the fabric to transmit data internally within the fabric. For example, a logical model may be rendered into concrete models for various nodes and the concrete models are used to assign TEP addresses to the nodes. Accordingly, each leaf node will have a corresponding physical TEP (PTEP) address that it has been assigned. The PTEP is an IP address that represents the leaf node's VXLAN tunnel endpoint (VTEP).

Each spine node that is configured to communicate with endpoints in the network fabric should know which leaf's PTEP address to use when communicating with a particular endpoint. For example, a simplified representation of the endpoint data collected from the spine nodes 502 of FIG. 5 may be:

TABLE 7

| EP1 | EP2 | EP3 | EP4 |
| --- | --- | --- | --- |
| Spine1 - TEP_L1 | Spine1 - TEP_L1 | Spine1 - TEP_L2 | Spine1 - TEP_L2 |
| Spine2 - TEP_L1 | Spine2 - TEP_L1 | Spine2 - TEP_L2 | Spine2 - TEP_L2 |

The endpoint data from the spines indicates that endpoints 1 and 2 (EP1 and EP2) are reachable by spine 1 and by spine 2 through the TEP address "TEP_L1." The TEP_L1 address should be the PTEP address for leaf 1, which "learned" or is connected to EP1 and EP2. Similarly, endpoints 3 and 4 (EP3 and EP4) are reachable by spine 1 and by spine 2 through the TEP address "TEP_L2." The TEP_L2 address should be the PTEP address for leaf 2 because EP3 and EP4 are connected to the network fabric through leaf 2. In some cases, however, the TEP address for an endpoint may be something other than the PTEP address for the leaf node that to which the endpoint is connected. For example, when an endpoint is connected to the network fabric through a virtual port channel (VPC), the spine node routes traffic to the endpoint through a virtual IP (VIP) address. This VIP address would be stored as the TEP address for the VPC endpoint.

There may be situations, however, where the TEP addresses from the different spines may be different from one another and situations where one or more spines has an incorrect TEP address for one or more of the endpoints. According to various aspects of the subject technology, the network assurance appliance is configured to determine whether the spine nodes have the correct TEP address for a leaf node where an endpoint is learned on or connected to. The TEP address may be a physical tunnel endpoint (PTEP) address for "single node" endpoints (e.g., endpoints that are connected to only the single leaf node) or a VIP address for VPC endpoints. Various checks may be performed to ensure that the spine nodes have correct TEP addresses for endpoints.

For example, the network assurance appliance may obtain endpoint information from one or more spine nodes. The endpoint information, such as is illustrated in table 7 above, includes TEP addresses for each endpoint that the spine(s) knows of. The network assurance appliance may query a leaf node for endpoint information. The endpoint information from the queried leaf node may include endpoint identifiers for one or more endpoints that the leaf node has learned or that the leaf node connects to the network fabric. For each endpoint identified by the queried leaf node, the network assurance can check each spine's endpoint information to make sure that the spine's endpoint information has the correct TEP address for the identified endpoint. The correct TEP address may be a PTEP for a leaf node that the endpoint is connected to or a VIP address for the endpoint in the endpoint is a VPC node. If an inconsistency is detected, the network assurance appliance may generate an event, notify a network administrator of the event, log the event, and/or attempt to resolve the issue.

Figure 7:
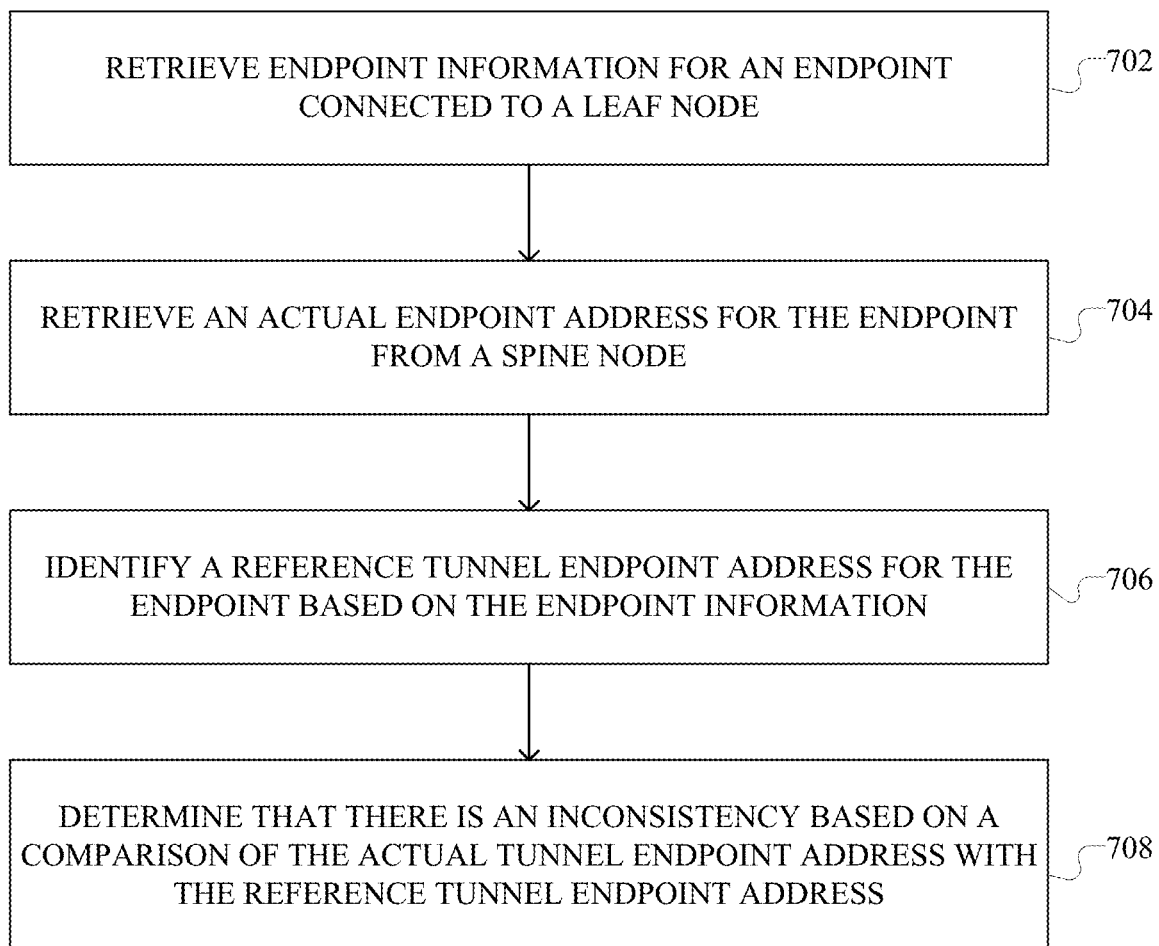
FIG. 7 illustrates an example method embodiment for validating tunnel endpoint addresses, in accordance with various aspects of the subject technology.

FIG. 7 illustrates an example method embodiment for validating an endpoint configuration between nodes, in accordance with various aspects of the subject technology. At operation 702 the network assurance appliance may retrieve endpoint information for an endpoint connected to a leaf node in the network fabric. For example, the network assurance appliance may query a leaf node in the network for endpoint information for all endpoints that are connected to the leaf node. The endpoint information may include various IP addresses, endpoint identifiers, flag information indicating an endpoint type (e.g., pervasive endpoint, single node endpoint, VPC endpoint, etc.).

At operation 704, an actual tunnel endpoint address for the endpoint may be retrieved from one or more spine nodes in the network. The actual tunnel endpoint address may be stored by the spine nodes and used to route network traffic to the endpoint.

At operation 706, the network assurance appliance may identify a reference tunnel endpoint address for the endpoint. According to some aspects of the subject technology, the reference tunnel endpoint address for an endpoint may depend on the type of endpoint. For example, the reference tunnel endpoint address for a single node endpoint is the PTEP address for the leaf node that the single node endpoint is connected to. The reference tunnel endpoint address for a VPC endpoint is the VIP address for the VPC that the endpoint uses to connect to the network fabric. The reference tunnel endpoint address for a pervasive endpoint may be the PTEP address for any of the leaf nodes that the pervasive endpoint is connected to.

The type of endpoint may be determined based on the retrieved endpoint information. For example, the endpoint information may include flags that indicate which type of endpoint that an endpoint is. In some implementations, the type of endpoint may be determined based on logical or concrete model information retrieved from a network controller.

At operation 708, the network assurance appliance determines whether there is an inconsistency based on a comparison of the actual tunnel endpoint address with the reference tunnel endpoint address. If the actual TEP address and the reference TEP do not match, an inconsistency may be declared.

Static Endpoint Validation

As noted above, some endpoints are learned. When the endpoint establishes a connection to a leaf node, the leaf node publicizes the route to the endpoint to other nodes in the network. However, endpoints may also be static in that, instead of being learned, the endpoint is defined by a network controller based on a logical model. This may be used, for example, to configure silent hosts in a network.

The network assurance appliance may perform various checks to validate static endpoint information in the fabric. For example, as discussed above, the network assurance appliance may obtain endpoint information from leaf nodes and spine nodes in the system and compare this information to detect inconsistencies between nodes. The endpoint information includes flags such as a flag indicating whether an endpoint is a static endpoint (e.g., an "is_static" flag). Accordingly, the static endpoint flag included in the endpoint information may be compared to determine whether there are inconsistencies with the flag.

The endpoint information also includes endpoint group identifier information for the endpoint group that an endpoint belongs to, interface/port identifiers for the interface/port that the endpoint is connected to, encap VLAN information for the endpoint, etc. The network assurance appliance may compare the above information from leaf nodes and spine nodes to detect inconsistencies.

Additionally, or alternatively, the network assurance appliance may check that any static endpoint defined by the logical model is detected by the nodes (e.g., leafs or spines) in the fabric and specified by the nodes as a static endpoint. The network assurance appliance may also check whether an endpoint identified by one or more of the nodes in the fabric as a static endpoint has a corresponding static endpoint defined by the logical model.

Figure 8:
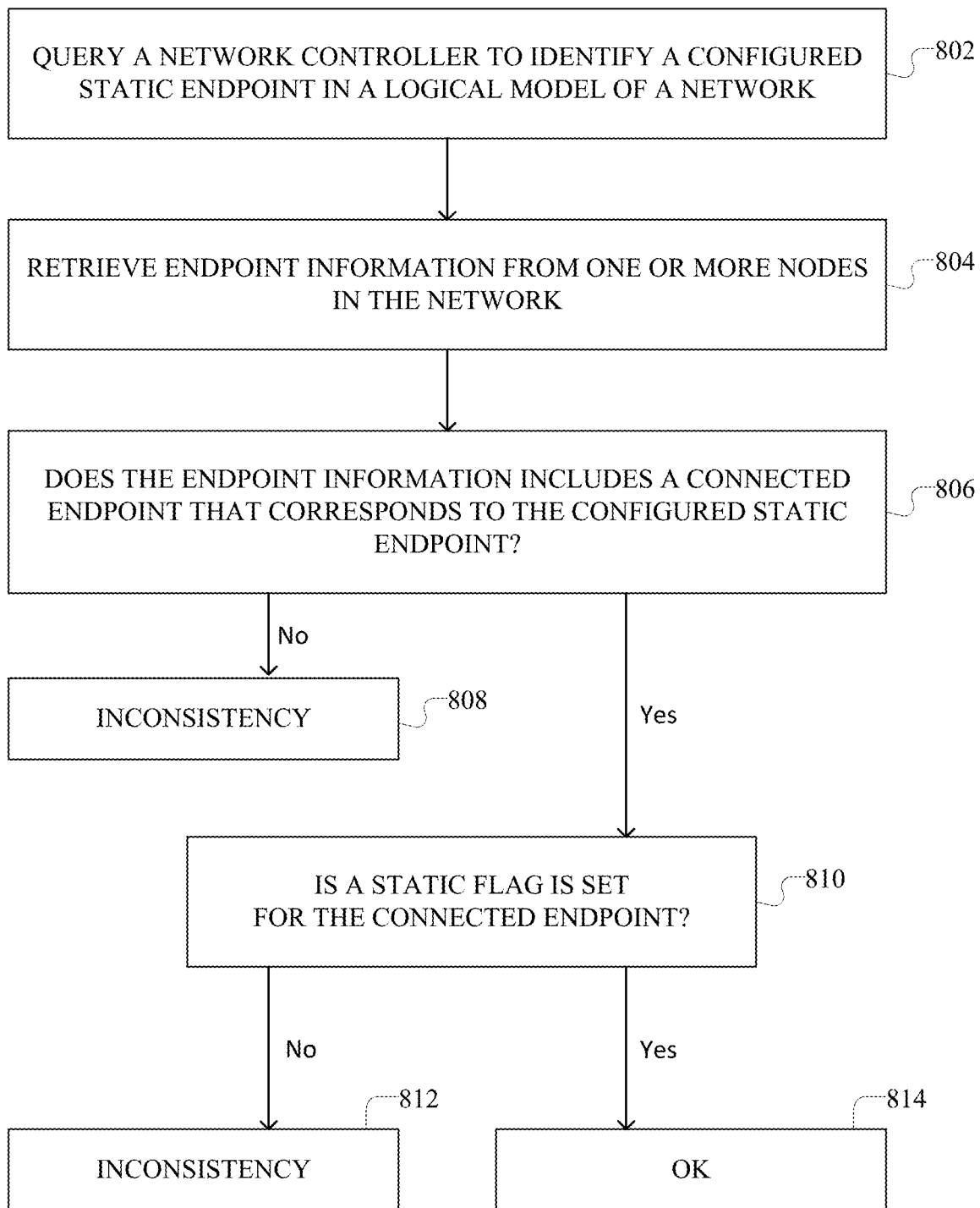
FIG. 8 illustrates an example method embodiment for static endpoint validation, in accordance with various aspects of the subject technology.

FIG. 8 illustrates an example method embodiment for static endpoint validation, in accordance with various aspects of the subject technology. At operation 802, the network assurance appliance may query a network controller to identify a configured static endpoint in a logical model of a network. At operation 804, endpoint information is retrieved from one or more nodes in the network. The endpoint information may be obtained from a leaf node, a spine node, or a combinations of nodes. At operation 806, the network assurance appliance determines whether the endpoint information includes a connected endpoint that corresponds to the configured static endpoint in the logical model.

For example, the logical model may specify that an endpoint is a static endpoint and include various information for the static endpoint. The information may include an endpoint identifier, a leaf node that the static endpoint is to connect to, a port that the static endpoint is to use to connect to the leaf node, flag information, or any other information associated with the static endpoint. The information about the static endpoint may vary and/or depend on a particular implementation. The endpoint information may correspond with the configured static endpoint in the logical model if some or all of the information in the configured static endpoint matches the endpoint information from the one or more nodes.

If there is no corresponding connected endpoint at operation 808, there is an inconsistency. If there is a corresponding connected endpoint, at operation 810 the static flag for the connected endpoint may be checked to see if it is set. If the static flag is not set, there is an inconsistency at operation 812. If the static flag is set, the static endpoint is validated for this check at operation 814. If an inconsistency is detected at operations 808 or 812, the network assurance appliance may generate an event, notify a network administrator of the event, log the event, and/or attempt to resolve the issue.

According to various aspects, the network assurance appliance may also detect a static endpoint in the network and determine whether the logical model has a corresponding static endpoint defined. For example, the network assurance appliance may retrieve endpoint information from one or more nodes in the network, identify a connected static endpoint in the endpoint information based on a static flag for the connected static endpoint being set, and query a network controller to determine whether there is a configured static endpoint in the logical model of the network. If there is no configured static endpoint that corresponds to the connected static endpoint, there is an inconsistency. If an inconsistency is detected, the network assurance appliance may generate an event, notify a network administrator of the event, log the event, and/or attempt to resolve the issue.

Endpoint IP BD Subnet Validation

A bridge domain (BD) represents a Layer 2 forwarding construct within a software-defined network fabric. The bridge domain may be linked to a VRF (e.g., a context or private network) and associated with one or more IP subnets (e.g., ranges of IP addresses). For example, the BD may define a unique Layer 2 MAC address space and a Layer 2 flood domain if such flooding is enabled. While a VRF defines a unique IP address space, that address space can consist of multiple subnets. Those subnets are defined in one or more bridge domains that reference the corresponding VRF.

Bridge domains can span multiple nodes (e.g., switches). According to some implementations, a bridge domain can contain multiple subnets. If the bridge domain (BD) limitIPLearnToSubnets flag/property is set to yes, endpoint learning will occur in the bridge domain if the IP address is within any of the configured subnets for the bridge domain or within an EPG subnet when the EPG is a shared service provider. Subnets can span multiple EPGs; one or more EPGs can be associated with one bridge domain.

A bridge domain may be defined and implemented for a tenant to help organize network traffic in a data center or fabric. For example, certain endpoint groups (EPGs) may have different functions or support different applications (e.g., web servers, database servers, application servers, etc.). Each EPG may be associated with a particular bridge domain (BD). Each bridge domain may be associated with one or more IP subnets.

According to various aspects of the subject technology, the network assurance appliance may be configured to check endpoints in a bridge domain to see whether the one or more IP addresses associated with each endpoint falls within one of the subnets associated with the bridge domain.

Figure 9:
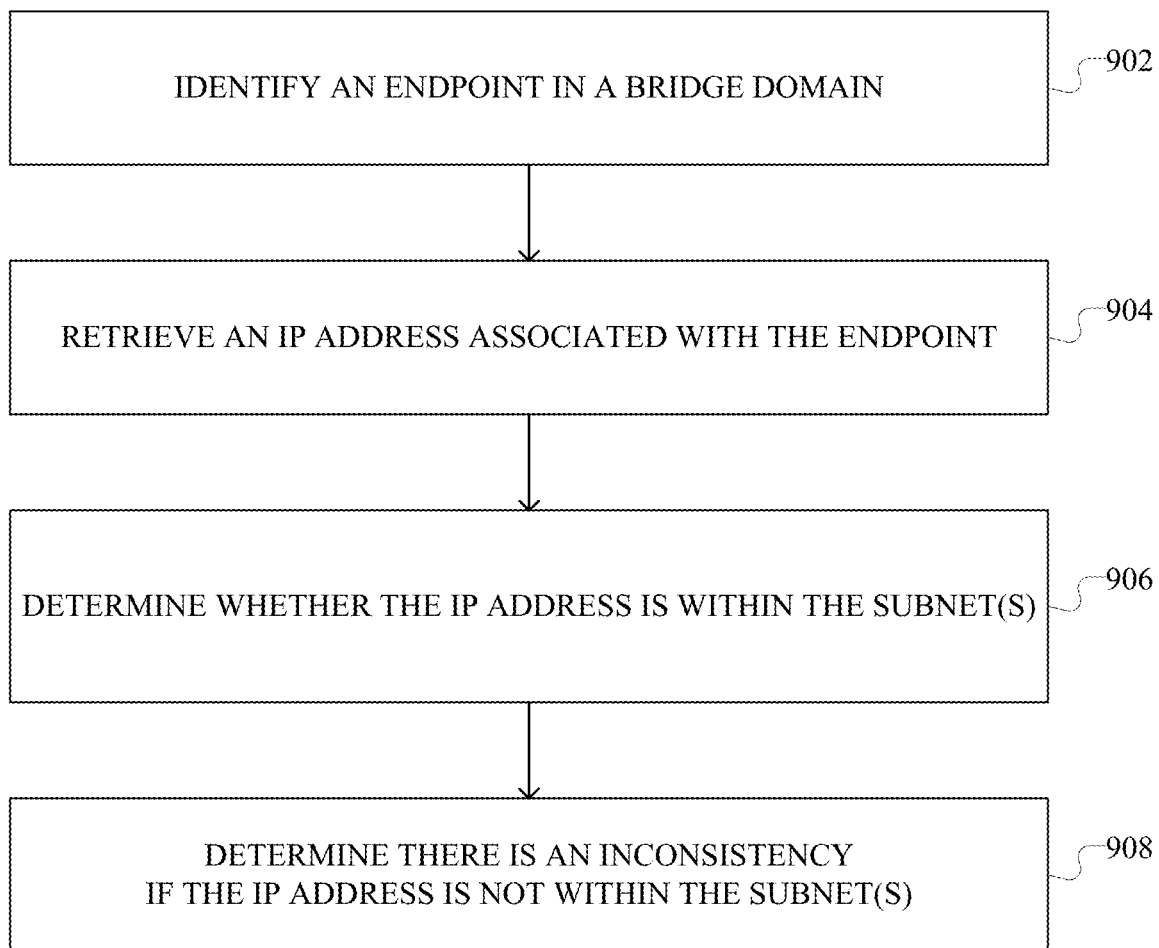
FIG. 9 illustrates an example method embodiment for endpoint bridge domain subnet validation, in accordance with various aspects of the subject technology.

FIG. 9 illustrates an example method embodiment for static endpoint validation, in accordance with various aspects of the subject technology. Bridge domains may be specified in a logical model as being associated with a bridge domain identifier, one or more subnets, and various flags or properties. One such flag may include a "Limit IP Learning to Subnet" flag which, if set, limits leaf node learning to IPs for the bridge domain subnet(s). This information may be stored at the network controller in the logical model.

The network assurance appliance may query the network controller for the logical model or the bridge domain specification in the logical mode. Also as described above, endpoint information for the various endpoints may be collected from one or more nodes in the fabric. This endpoint information includes the various IP addresses each endpoint is associated with. Below is a simplified representation of the information stored in the bridge domain specification for Bridge Domain A (see Table 8) as well as a simplified representation of endpoint information for EP1 (see Table 9):

TABLE 8

| Bridge Domain A |
| --- |
| Subnet1 |
| Subnet2 |
| Subnet3 |
| Limit_IP_Learning_to_Subnet flag [x] |

TABLE 9

| EP1 |
| --- |
| IP1 |
| IP2 |
| IP9 |

The simplified representation of the bridge domain specification indicates that bridge domain A is associated with subnets 1, 2, and 3. The simplified representation of endpoint information for EP1 indicates that EP1 is associated with the IP1, IP2, and IP9 IP addresses.

At operation 902, the network assurance appliance may identify one or more endpoints in a bridge domain. The network assurance appliance may retrieve, for each endpoint, endpoint information from the one or more nodes in the fabric. At operation 904, at least one IP address associated with the endpoint is retrieved. The network assurance appliance may determine whether each IP address is within one of the subnets associated with the bridge domain at operation 906. If we use the information provided in tables 8 and 9 above as an example, the network assurance appliance will determine whether each of IP1, IP2, and IP9 are within one of subnet1, subnet2, or subnet 3.

If each IP address is within one of the subnets, there is no inconsistency. If not, however, the network assurance appliance may determine that there is an inconsistency at operation 908 and the network assurance appliance may generate an event, notify a network administrator of the event, log the event, and/or attempt to resolve the issue.

According to some implementations, the network assurance appliance may also determine whether the flag for limiting IP learning to subnets is set of the bridge domain. In some cases, this may determine whether the operations 902-908 are performed at all. In some cases, whether the flag is set may help determine the rating of an event or notification (e.g., an important, serious, critical event or notification versus a lower tiered event or notification).

Virtual Port Channels (VPCs)

A virtual port channel (VPC) allows links that are connected to two different leaf nodes to appear as a single port channel to other devices (e.g., spines, leafs, endpoints, etc.). A VPC can provide Layer 2 multipathing, which allows you to create redundancy by increasing bandwidth, enabling multiple parallel paths between nodes, and load-balancing traffic where alternative paths exist. Although various aspects discuss VPCs allowing endpoints to connect to two leaf nodes, in other implementations, VPCs may allow for endpoints to connect to any number of leaf nodes.

To create a VPC domain, VPC peers, also known as VPC switches, are typically joined together to combine the multiple physical links into a single logical link. In order to operate as one logical device, the VPC peers may communicate with each other to exchange data as well as various forms of internal state information to keep synchronized with each other. The resultant VPC domain can provide switching and routing services to any endpoint hosts that may sit behind the VPC such that the endpoints can seamlessly communicate with the rest of the network.

Figure 10:
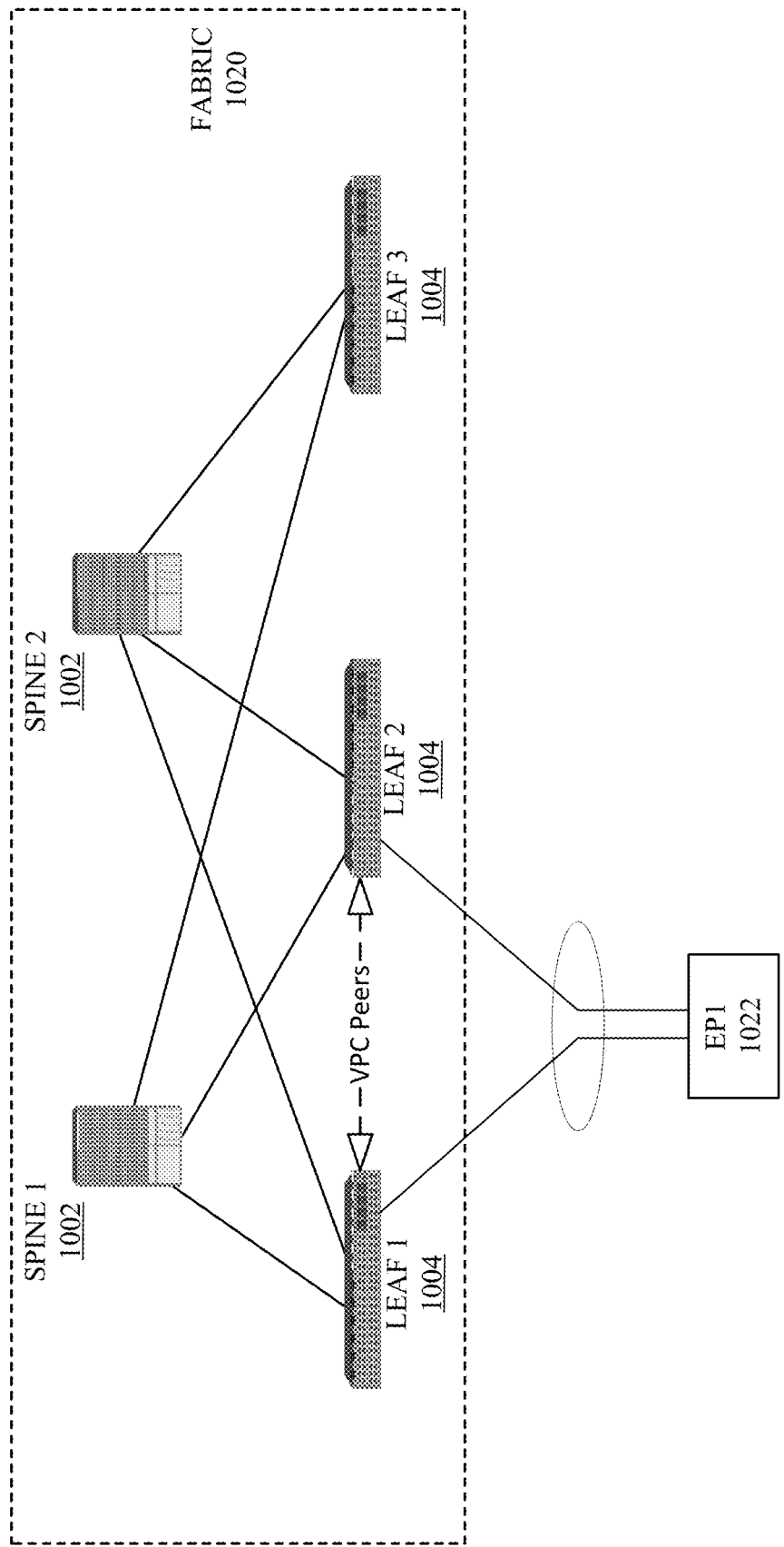
FIG. 10 illustrates an example network environment, in accordance with various aspects of the subject technology.

FIG. 10 illustrates an example network environment, in accordance with various aspects of the subject technology. In this example, network environment 1000 includes endpoints 1022 connected to leafs 1004 in fabric 1020. Fabric 1020 can include spines 1002 (e.g., spine routers or switches) and leafs 1004 (e.g., leaf routers or switches) which can be interconnected for routing or switching traffic in the fabric 1020. Spines 1002 can interconnect leafs 1004 in the fabric 1020, and leafs 1004 can connect the fabric 1020 to an overlay or logical portion of the network environment 1000, which can include application services, servers, virtual machines, containers, endpoints, etc. Thus, network connectivity in the fabric 1020 can flow from spine nodes 1002 to leaf nodess 1004, and vice versa.

A logical model stored on a network controller may specify a VPC by enabling the configuration of leaf nodes to act as VPC peers such that an endpoint connected to the VPC can communicate with the rest of the network via the VPC. The network controller may generate concrete models based on the logical model and have the concrete models implemented across the nodes in the fabric. In FIG. 10, endpoint 1 (EP1) is implemented as a VPC endpoint and leaf 1 and leaf 2 are defined as VPC peers. More specifically, when the logical model is rendered and implemented on the nodes, the endpoint information for EP1 has a VPC flag set, indicating the EP1 is a VPC endpoint. Although a leaf is associated with a TEP address used to help route traffic through the fabric, in the VPC case, the leaf also uses a virtual IP (VIP) address to enable access to the VPC. The two VPC peers share the same VIP address that enables access to the VPC attached endpoints.

According to various aspects, the network assurance appliance may collect various data about the VPC endpoints in the fabric from nodes in the fabric as well as the network controller and perform various validation checks on the VPC information.

According to some aspects of the subject technology, a network assurance appliance may analyze endpoint data from leaf nodes to ensure that the leaf nodes that detect a VPC endpoint associate the VPC endpoint with the same VIP address (e.g., each VPC peer has a matching VIP address for the VPC endpoint). In some cases, the VIP address may be assigned by the network controller when rendering the logical model into the concrete model. Endpoint data from spine nodes may also be analyzed to ensure that the spine nodes have the correct VIP address for the VPC endpoint so that the VPC endpoint may be reachable via the VIP address.

In some implementations, a properly configured VPC endpoint is connected to exactly two leaf nodes. Accordingly, the network assurance appliance may check that a VPC endpoint is connected to exactly two leaf nodes. In other implementations, however, a VPC endpoint may connect to different or varying numbers of leaf nodes and similar checks may be performed to ensure that a VPC endpoint is connected to a proper number of leaf nodes in the fabric.

Figure 11:
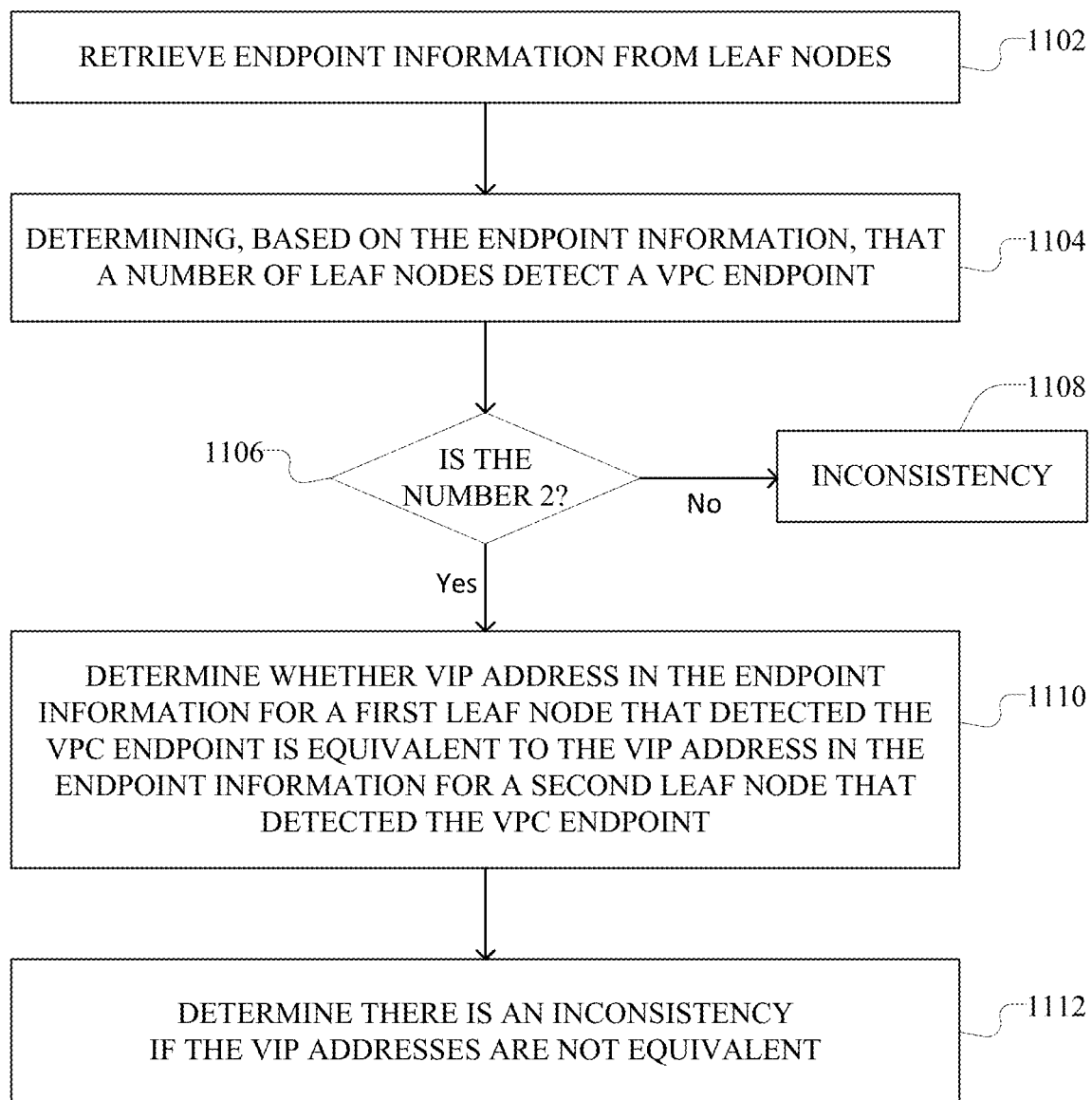
FIG. 11 illustrates an example method embodiment for validating virtual port channel endpoints, in accordance with various aspects of the subject technology.

FIG. 11 illustrates an example method embodiment for VPC endpoint validation, in accordance with various aspects of the subject technology. At operation 1102, the network assurance appliance may retrieve endpoint information from leaf nodes in the fabric. The endpoint information may include various information including VIP addresses and flags (e.g., an "is_VPC" flag) for any virtual port channel (VPC) endpoints. Using the endpoint information, the network assurance appliance determines how many leaf nodes in the fabric detect a VPC endpoint at operation 1104. There are various ways to determine how many leaf nodes detect a particular VPC endpoint. For example, the network assurance appliance may determine how many leaf nodes are connected to an endpoint based on an endpoint identifier and whether the endpoint information for that endpoint kept by each those leaf nodes both have VPC flags set for that endpoint.

At operation 1106, the network assurance appliance determines whether the number of leaf nodes that detect the VPC endpoint is two at operation 1106. If the number of leaf nodes that detects the VPC endpoint is not two, the network assurance appliance declares an inconsistency because a VPC, according to some implementations, should be connected to exactly two leaf nodes. In other implementations, however, the network assurance appliance can check for other configurations.

If the number of leaf nodes connected to the VPC endpoint is two, a first leaf node and a second leaf node, the process may proceed to operation 1110. The network assurance appliance may retrieve endpoint information from the first leaf node that detected the VPC endpoint and endpoint information from the second leaf node that detected the VPC endpoint. The endpoint information may include virtual internet protocol (VIP) addresses for the detected VPC endpoint. At operation 1110, the network assurance appliance determines whether the VIP address from the first leaf node is equivalent to the VIP address from the second leaf node and declares an inconsistency when the VIP addresses are not equivalent at operation 1112.

According to various aspects of the subject technology, the network assurance appliance may also validate VPC endpoint information from the spine nodes against VPC endpoint information from the leaf nodes. For example, endpoint information from leaf nodes and spine nodes may be retrieved. If a leaf node identifies an endpoint as being a VPC endpoint (e.g., based on a VPC flag), the network assurance appliance may compare the endpoint information for the VPC endpoint from the leaf node with the corresponding endpoint information from one or more spine nodes and perform various checks.

For example, if the information from the leaf nodes indicates that an endpoint is a VPC endpoint, the information from the spine nodes should indicate that the VPC endpoint is reachable via a VIP address (and not a TEP address). If, according to the data from the spine nodes, the VPC endpoint is reachable via a TEP address, there is an inconsistency. This may indicate incorrect information in a spine node and/or one or more leaf nodes being connected to the VPC endpoint through a non-VPC port. In other words, one or more leaf nodes may also be connected to the VPC endpoint (not the VPC peers), but treating it as a traditional endpoint.

The network assurance appliance may also determine whether, according to the routing information from the spine nodes, the VPC endpoint is assigned to the same VIP address as is found in the endpoint information from the leaf nodes. If VPC endpoint is not assigned the same VIP address according to the information from the spine nodes, there is an inconsistency. The network assurance appliance may also check the VIP address for the VPC endpoint with other VIP addresses to ensure that the VIP address is uniquely assigned to the VPC endpoint.

According to various aspects of the subject technology, the network assurance appliance may perform much of the same validations processes as described above, however, because the VPC endpoint connects to more than one leaf node, the network assurance appliance may compare the endpoint information from a first VPC peer leaf node with endpoint information from a second VPC peer leaf node. If there is a mismatch in the information, an inconsistency is declared. Information that may be checked may include, for example, endpoint group information, flags (e.g., is_static flag, pctag flag, etc.), IP addresses, or other endpoint information.

According to various aspects of the subject technology, the network assurance appliance may perform various checks and generate various events based on the performed checks. For example, if an inconsistency or error is found based on a performed check, the network assurance appliance may generate an event and store the event in an event log. If, based on a check, certain network configurations are operating correctly or no error is found, the network assurance appliance may also generate an event indicating that no error is found with respect to the performed check and store the event in an event log.

The generated events may be provided to a network administrator to inform the network administrator about the status of the network fabric and/or suggest potential actions to take. For example, the events may be used to generate a notification, a report, a user interface, or other medium to inform the network administrator.

FIGS. 12A-12F illustrate example user interfaces, in accordance with various aspects of the subject technology. The network assurance appliance may provide various user interfaces or enable various user interfaces for network administrators to view the status of the network fabric and, in particular, the endpoint configuration in the network fabric.

Figure 12A:
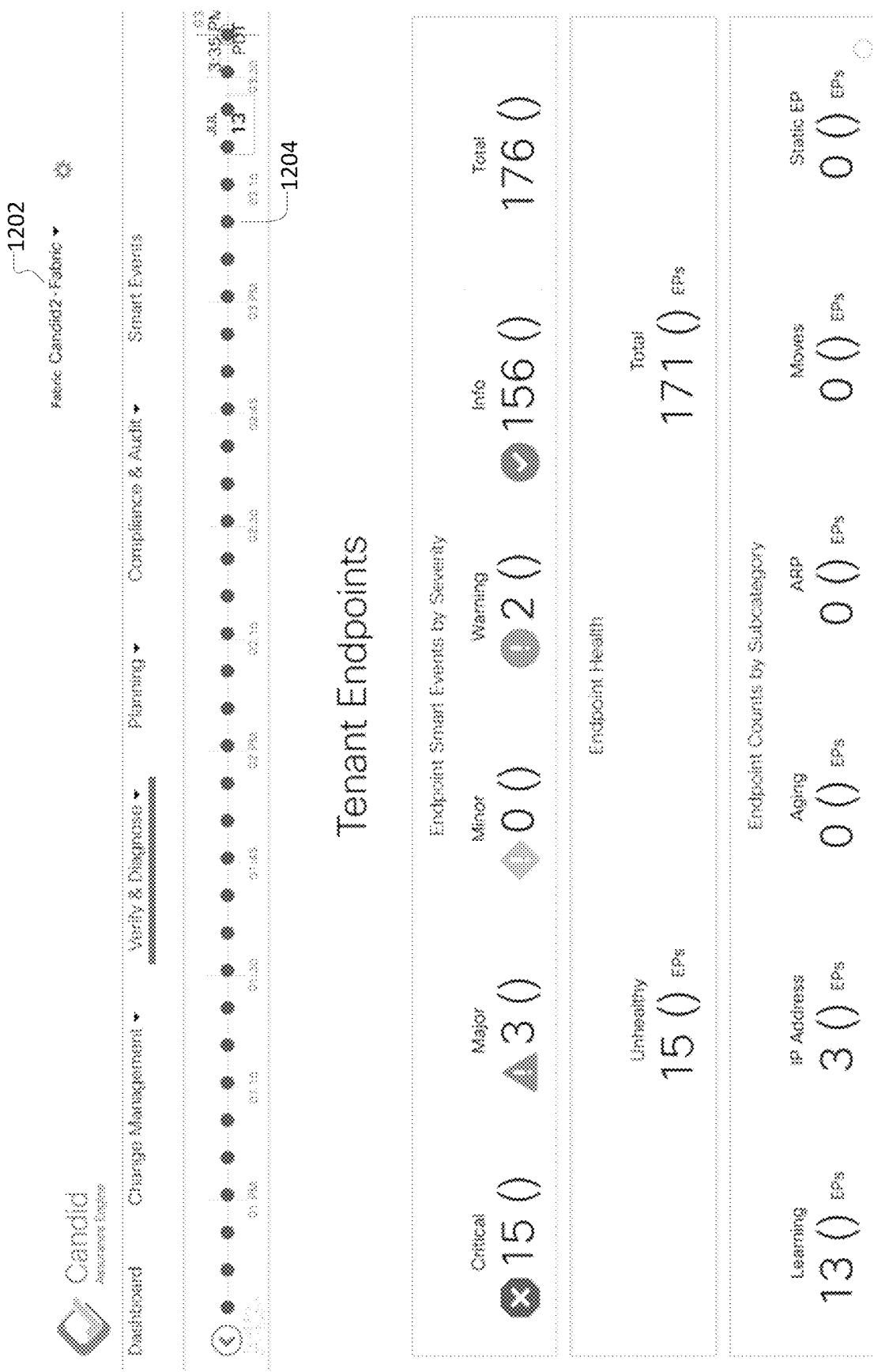
FIGS. 12A-12F illustrate example user interfaces, in accordance with various aspects of the subject technology.

For example, FIG. 12A illustrates an example interface where a network administrator may select a network fabric for viewing using interface element 1202 and a particular time period at using interface element 1204. In response to the selections, the network assurance appliance may provide information relating to endpoint and fabric configuration across the selected network fabric at a particular time period. For example, the network assurance appliance may perform various checks periodically, generate events based on the checks, and store the events in event logs. This information may be summarized and categorized by, for example, severity of the event(s), health of the endpoints (EPs), or type of endpoint events as shown in FIG. 12A. Furthermore, the information may be grouped based on the time period in which they can be attributed to so that the network administrator can identify trends and changes in the network fabric over time.

According to various aspects of the subject technology, the network assurance appliance may compute a score for an endpoint, an endpoint group, a tenant, an app profile, a VRF, a bridge domain, a tenant, or any other entity in the network fabric based on a number of events, the type of events generated, the severity of events generated, and/or trends or patterns in the events over time.

For example, a health score may be calculated for endpoints in the network based on a number of events associated with the endpoint, the type of events associated with the endpoint, the severity of those events, and/or event trends over time. An endpoint may be categorized as healthy or unhealthy based on the health score. For example, if the health score of an endpoint is above a threshold, it may be considered healthy. If the endpoint's health score is below the threshold, it may be considered unhealthy. The threshold may be based on a set value, an average value, or may be a combination of thresholds.

Figure 12B:
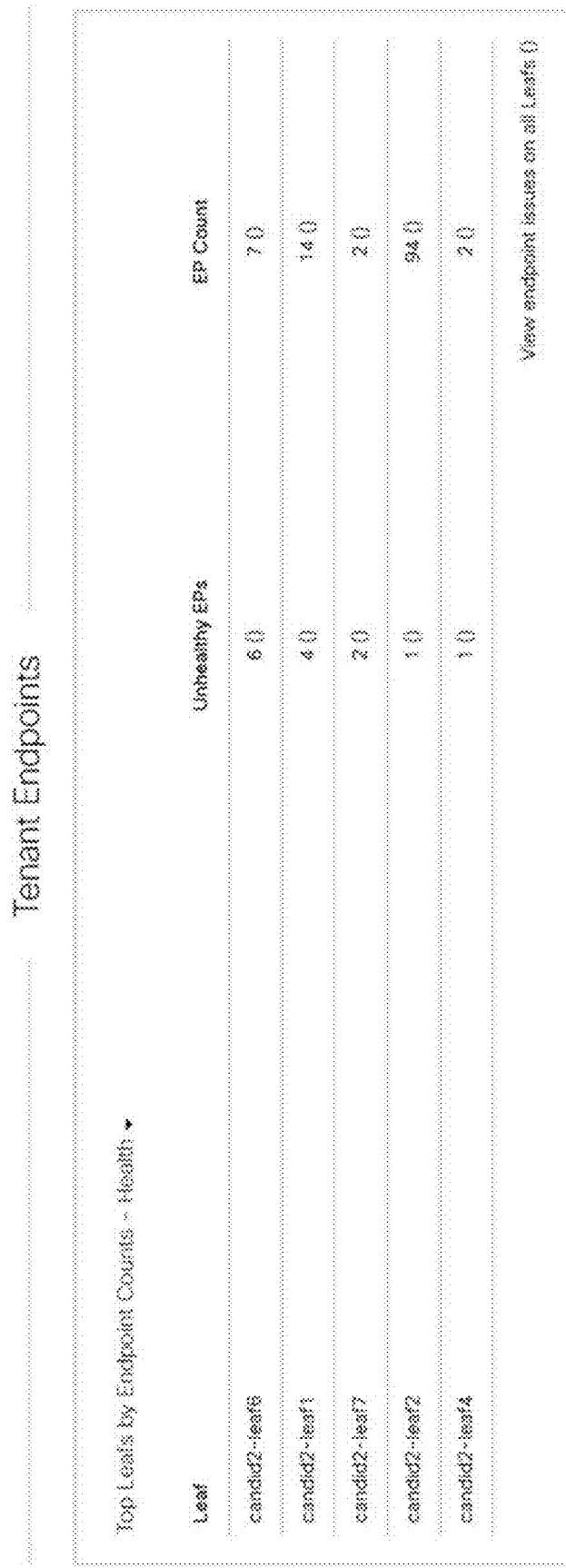

FIG. 12B illustrates an example interface that provides a visualization of the relationship between a leaf node, a set of endpoints associated with the leaf node, and unhealthy endpoints in the set. In particular, the example interface shown in FIG. 12B provides a list of leaf nodes in the fabric, the total number of endpoints (EPs) connected to each leaf node, and the number of endpoints that are considered unhealthy that are connected to each leaf node. In other embodiments, the total number of endpoints and unhealthy endpoints may be provided for an endpoint group, a tenant, an app profile, a VRF, a bridge domain, a tenant, or any other entity in the network fabric.

Figure 12C:
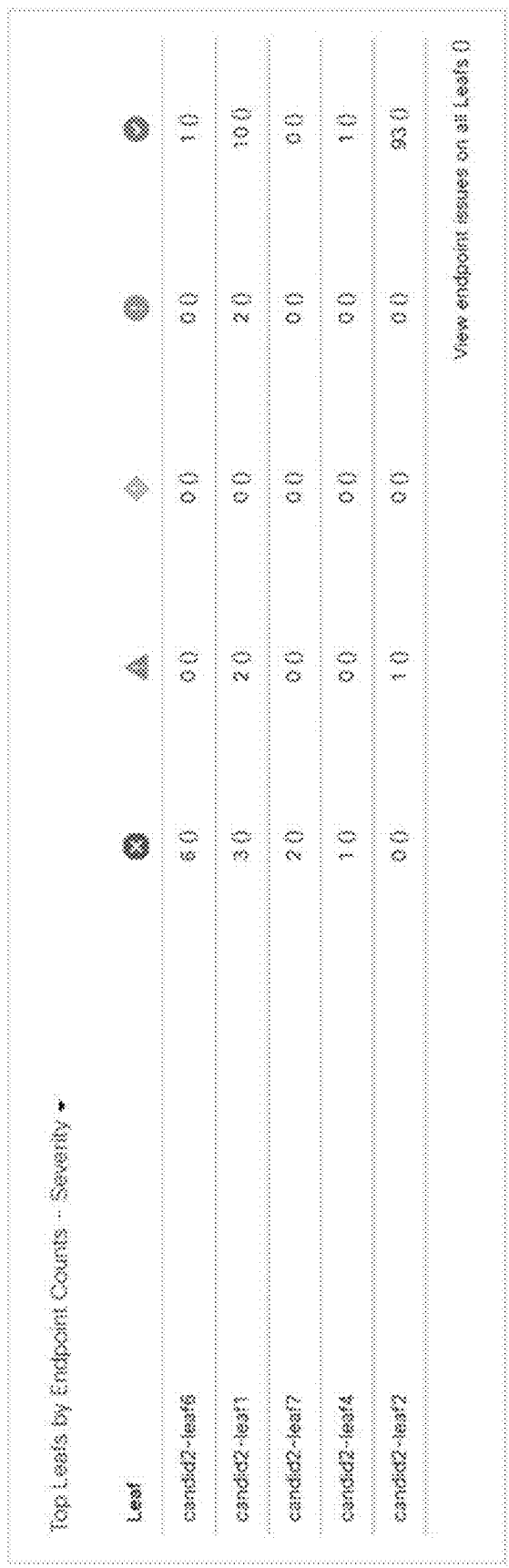

FIG. 12C illustrates an example interface that provides a visualization of the relationship between a leaf node and a number of events associated with the leaf node. The events are grouped based on the severity of the events. For example, leaf 1 in the "candid2" fabric is associated with 3 critical events, 2 major events, 0 minor events, 2 warnings, and 12 informational events. In other embodiments, other types of categories based on event severity may be used. Furthermore, in other embodiments, the number of events based on severity may be provided for an endpoint group, a tenant, an app profile, a VRF, a bridge domain, a tenant, or any other entity in the network fabric.

Figure 12D:
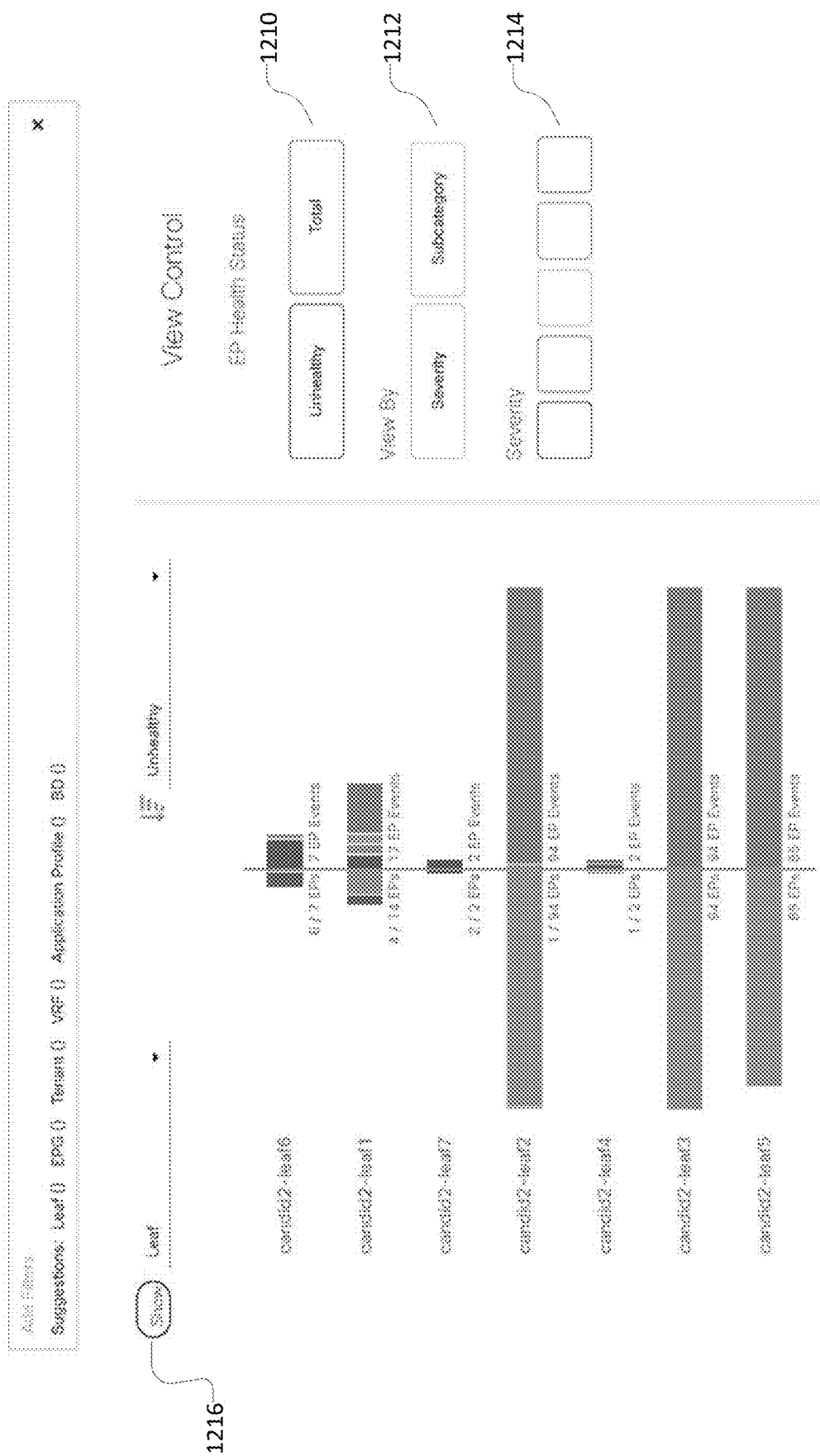
Figure 12E:
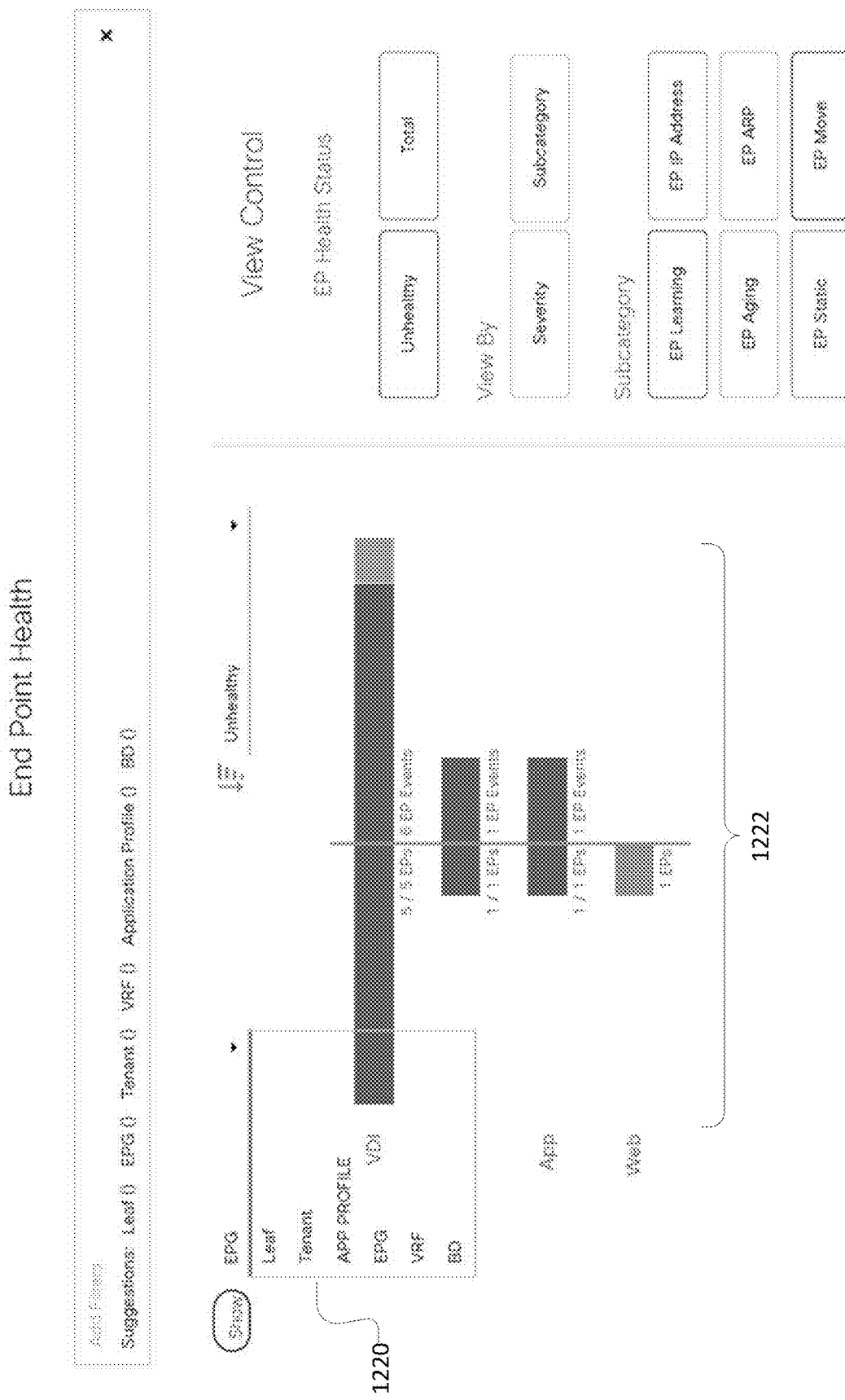

FIGS. 12D and 12E provide additional example interfaces that enable a network administrator to interact with the interface and select views of the information. For example, FIG. 12D illustrates an example interface that provides a visualization of the health of a leaf node. The interface may provide a network administrator with a view of the total number of endpoints connected to a leaf node and/or a number of unhealthy endpoints connected to the leaf node. The interface may provide a network administrator with a view of the total number of events associated with a leaf node, which may be organized based on severity or subcategory (e.g., the type of event). Interface element 1210 enables a network administrator to view unhealthy endpoints, all endpoints, or both. Interface element 1212 enables a network administrator to view events based on severity or subcategory. The user interface may be color coded to improve readability. Interface element 1214 provides a key to illustrate what severity each color corresponds. The network administrator can select a color to view additional information.

As discussed above, the information provided in the user interfaces may be for leaf nodes, endpoint groups, tenants, app profiles, VRFs, bridge domains, tenants, or other entity type in the network fabric. Interface element 1216 enables a network administrator to select the view based on the entity type. FIG. 12E illustrates an example interface providing information based on endpoint groups. Interface element 1220 illustrates a dropdown menu showing possible entity types that may be selected and used to provide information to a network administrator. In interface element 1220, an endpoint group (EPG) entity type is selected. Accordingly, interface element 1222 displays information organized based on the endpoint groups in the network fabric (e.g., an App endpoint group, a Web endpoint group, etc.).

Figure 12F:
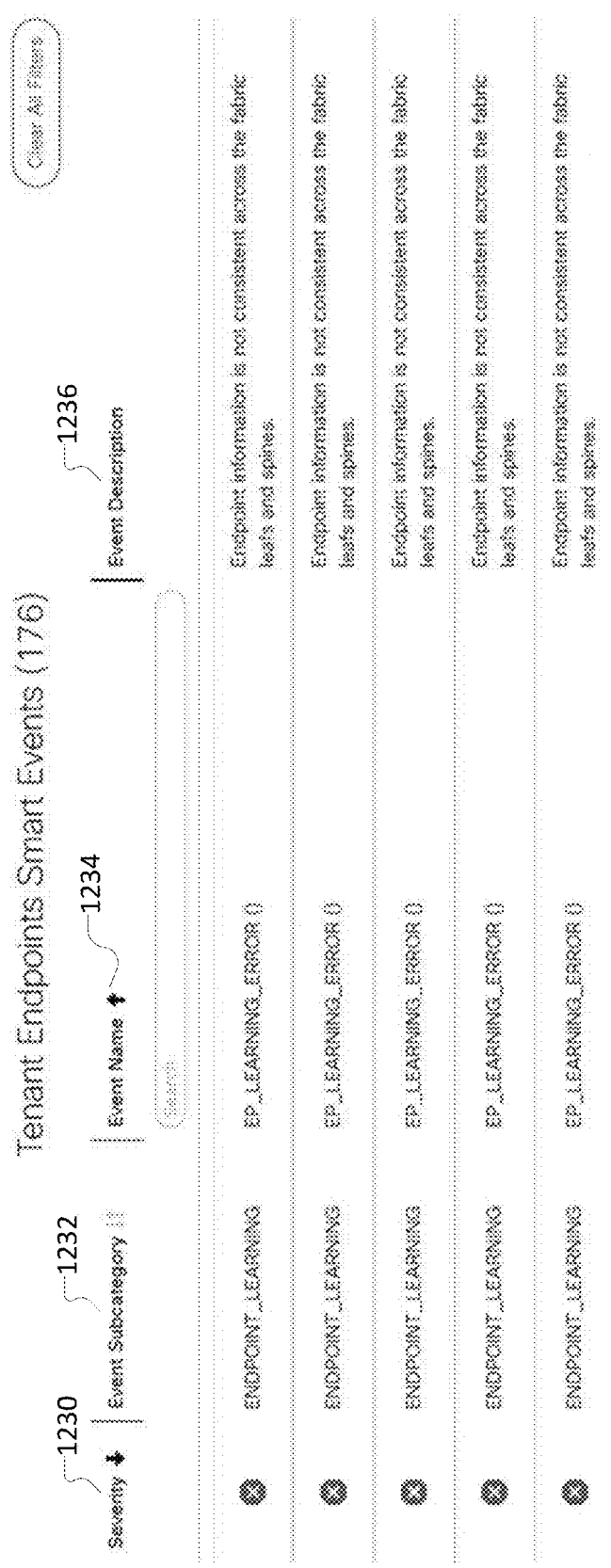

FIG. 12F illustrates an example interface that enables a network administrator to view events and select a particular event to view more information on. For example, the interface in FIG. 12F may show all events during a particular time period or events for a particular entity (e.g., a leaf, an endpoint group, a tenant, an app profile, a VRF, a bridge domain, a tenant) during the time period. For example, a network administrator may select a particular entity shown in FIGS. 12A-12E to view all events for a time period associated with that entity.

Each row in FIG. 12F may correspond with an event in the event log. Column 1230 may indicate the severity of each event, column 1232 may indicate the subcategory or event type for each event, column 1234 may indicate the event name for each event, and 1236 may provide an event description for each event. The network administrator may select a row for an event to view more information about the event.

The disclosure now turns to FIGS. 13 and 14, which illustrate example network devices and computing devices, such as switches, routers, load balancers, client devices, and so forth.

FIG. 13 illustrates an example network device 1300 suitable for performing switching, routing, load balancing, and other networking operations. Network device 1300 includes a central processing unit (CPU) 1304, interfaces 1302, and a bus 1310 (e.g., a PCI bus). When acting under the control of appropriate software or firmware, the CPU 1304 is responsible for executing packet management, error detection, and/or routing functions. The CPU 1304 preferably accomplishes all these functions under the control of software including an operating system and any appropriate applications software. CPU 1304 may include one or more processors 1308, such as a processor from the INTEL X86 family of microprocessors. In some cases, processor 1308 can be specially designed hardware for controlling the operations of network device 1300. In some cases, a memory 1306 (e.g., non-volatile RAM, ROM, etc.) also forms part of CPU 1304. However, there are many different ways in which memory could be coupled to the system.

The interfaces 1302 are typically provided as modular interface cards (sometimes referred to as "line cards"). Generally, they control the sending and receiving of data packets over the network and sometimes support other peripherals used with the network device 1300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 13 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 1300.

Regardless of the network device's configuration, it may employ one or more memories or memory modules (including memory 1306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1306 could also hold various software containers and virtualized execution environments and data.

The network device 1300 can also include an application-specific integrated circuit (ASIC), which can be configured to perform routing and/or switching operations. The ASIC can communicate with other components in the network device 1300 via the bus 1310, to exchange data and signals and coordinate various types of operations by the network device 1300, such as routing, switching, and/or data storage operations, for example.

FIG. 14 illustrates a computing system architecture 1400 wherein the components of the system are in electrical communication with each other using a connection 1405, such as a bus. Exemplary system 1400 includes a processing unit (CPU or processor) 1410 and a system connection 1405 that couples various system components including the system memory 1415, such as read only memory (ROM) 1420 and random access memory (RAM) 1425, to the processor 1410. The system 1400 can include a cache of high-speed memory connected directly with, in close proximity to, or integrated as part of the processor 1410. The system 1400 can copy data from the memory 1415 and/or the storage device 1430 to the cache 1412 for quick access by the processor 1410. In this way, the cache can provide a performance boost that avoids processor 1410 delays while waiting for data. These and other modules can control or be configured to control the processor 1410 to perform various actions. Other system memory 1415 may be available for use as well. The memory 1415 can include multiple different types of memory with different performance characteristics. The processor 1410 can include any general purpose processor and a hardware or software service, such as service 1 1432, service 2 1434, and service 3 1436 stored in storage device 1430, configured to control the processor 1410 as well as a special-purpose processor where software instructions are incorporated into the actual processor design. The processor 1410 may be a completely self-contained computing system, containing multiple cores or processors, a bus, memory controller, cache, etc. A multi-core processor may be symmetric or asymmetric.

To enable user interaction with the computing device 1400, an input device 1445 can represent any number of input mechanisms, such as a microphone for speech, a touch-sensitive screen for gesture or graphical input, keyboard, mouse, motion input, speech and so forth. An output device 1435 can also be one or more of a number of output mechanisms known to those of skill in the art. In some instances, multimodal systems can enable a user to provide multiple types of input to communicate with the computing device 1400. The communications interface 1440 can generally govern and manage the user input and system output. There is no restriction on operating on any particular hardware arrangement and therefore the basic features here may easily be substituted for improved hardware or firmware arrangements as they are developed.

Storage device 1430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1425, read only memory (ROM) 1420, and hybrids thereof.

The storage device 1430 can include services 1432, 1434, 1436 for controlling the processor 1410. Other hardware or software modules are contemplated. The storage device 1430 can be connected to the system connection 1405. In one aspect, a hardware module that performs a particular function can include the software component stored in a computer-readable medium in connection with the necessary hardware components, such as the processor 1410, connection 1405, output device 1435, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
retrieving, from a first leaf node in a network, first endpoint information for a first set of endpoints connected to the first leaf node;
retrieving, from a second leaf node in the network, second endpoint information for a second set of endpoints connected to the second leaf node;
comparing a first endpoint identifier and a first endpoint flag status within the first endpoint information with a second endpoint identifier and a second endpoint flag status within the second endpoint information; and identifying, based on the comparing, an inconsistency when the first endpoint identifier and the second endpoint identifier match and the first endpoint flag status and the second endpoint flag status do not match.

2. The computer-implemented method of claim 1, wherein the first endpoint information includes an endpoint identifier for a VPC endpoint and a VPC flag that is set.

3. The computer-implemented method of claim 1, the method further comprising:
retrieving, from a third leaf node in the network, third endpoint information for a third set of endpoints connected to the third leaf node; and
wherein the identifying of the inconsistency is based on the first endpoint information, the second endpoint information, and the third endpoint information each including an identical endpoint identifier.

4. The computer-implemented method of claim 1, wherein the first endpoint information comprises a first virtual internet protocol (VIP) address and the second endpoint information comprises a second VIP address, and the identifying of the inconsistency is based on the first VIP address being different from the second VIP address.

5. The computer-implemented method of claim 4, wherein the first VIP address is assigned to a first endpoint by a network controller.

6. The computer-implemented method of claim 1, further comprising:
retrieving, from a third leaf node in the network, third endpoint information for a third set of endpoints connected to the third leaf node; and
wherein the identifying of the inconsistency is based on the first endpoint information, the second endpoint information, and the third endpoint information each including an identical VIP address.

7. The computer-implemented method of claim 1, wherein the first endpoint information comprises a configured VIP address, the method further comprising:
retrieving, from a network controller in the network, an intended VIP address for the first endpoint; and
identifying a second inconsistency when the intended VIP address for the first endpoint does not match the configured VIP address for the first endpoint.

8. A system comprising:
at least one computer-readable storage medium having stored therein instructions;
a processor programmed to cooperate with the instructions to perform operations comprising:
retrieving, from a first leaf node in a network, first endpoint information for a first set of endpoints connected to the first leaf node;
retrieving, from a second leaf node in the network, second endpoint information for a second set of endpoints connected to the second leaf node;
comparing a first endpoint identifier and a first endpoint flag status within the first endpoint information with a second endpoint identifier and a second endpoint flag status within the second endpoint information; and
identifying, based on the comparing, an inconsistency when the first endpoint identifier and the second endpoint identifier match and the first endpoint flag status and the second endpoint flag status do not match.

9. The system of claim 8, wherein the first endpoint information includes an endpoint identifier for a VPC endpoint and a VPC flag that is set.

10. The system of claim 8, the operations further comprising:
retrieving, from a third leaf node in the network, third endpoint information for a third set of endpoints connected to the third leaf node; and
wherein the identifying of the inconsistency is based on the first endpoint information, the second endpoint information, and the third endpoint information each including an identical endpoint identifier.

11. The system of claim 8, wherein the first endpoint information comprises a first virtual internet protocol (VIP) address and the second endpoint information comprises a second VIP address, and the identifying of the inconsistency is based on the first VIP address being different from the second VIP address.

12. The system of claim 11, wherein the first VIP address is assigned to a first endpoint by a network controller.

13. The system of claim 8, the operations further comprising:
retrieving, from a third leaf node in the network, third endpoint information for a third set of endpoints connected to the third leaf node; and
wherein the identifying of the inconsistency is based on the first endpoint information, the second endpoint information, and the third endpoint information each including an identical VIP address.

14. The system of claim 8, wherein the first endpoint information comprises a configured VIP address, the operations further comprising:
retrieving, from a network controller in the network, an intended VIP address for the first endpoint; and
identifying a second inconsistency when the intended VIP address for the first endpoint does not match the configured VIP address for the first endpoint.

15. A non-transitory computer-readable storage media comprising instructions stored therein instructions which, when executed by a processor, cause the processor to perform operations comprising:
retrieving, from a first leaf node in a network, first endpoint information for a first set of endpoints connected to the first leaf node;
retrieving, from a second leaf node in the network, second endpoint information for a second set of endpoints connected to the second leaf node;
comparing a first endpoint identifier and a first endpoint flag status within the first endpoint information with a second endpoint identifier and a second endpoint flag status within the second endpoint information; and
identifying, based on the comparing, an inconsistency when the first endpoint identifier and the second endpoint identifier match and the first endpoint flag status and the second endpoint flag status do not match.

16. The media of claim 15, wherein the first endpoint information includes an endpoint identifier for a VPC endpoint and a VPC flag that is set.

17. The media of claim 15, the operations further comprising:
retrieving, from a third leaf node in the network, third endpoint information for a third set of endpoints connected to the third leaf node; and
wherein the identifying of the inconsistency is based on the first endpoint information, the second endpoint information, and the third endpoint information each including an identical endpoint identifier.

18. The media of claim 15, wherein the first endpoint information comprises a first virtual internet protocol (VIP) address and the second endpoint information comprises a second VIP address, and the identifying of the inconsistency is based on the first VIP address being different from the second VIP address.

19. The media of claim 18, wherein the first VIP address is assigned to a first endpoint by a network controller.

20. The media of claim 15, the operations further comprising:
- retrieving, from a third leaf node in the network, third endpoint information for a third set of endpoints connected to the third leaf node; and
- wherein the identifying of the inconsistency is based on the first endpoint information, the second endpoint information, and the third endpoint information each including an identical VIP address.

* * * * *